US012455662B2

(12) United States Patent
Koike

(10) Patent No.: US 12,455,662 B2
(45) Date of Patent: Oct. 28, 2025

(54) SENSOR CONTROLLER, ELECTRONIC DEVICE, AND CONTROL METHOD OF SENSOR CONTROLLER

(71) Applicant: Wacom Co., Ltd., Saitama (JP)

(72) Inventor: Takeshi Koike, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/602,563

(22) Filed: Mar. 12, 2024

(65) Prior Publication Data
US 2024/0220054 A1 Jul. 4, 2024

Related U.S. Application Data

(63) Continuation of application No. PCT/JP2022/038819, filed on Oct. 18, 2022.

(30) Foreign Application Priority Data

Nov. 11, 2021 (JP) ................................. 2021-183943

(51) Int. Cl.
G06F 3/044 (2006.01)
(52) U.S. Cl.
CPC .................... G06F 3/044 (2013.01)
(58) Field of Classification Search
CPC ...... G06F 3/044; G06F 3/041; G06F 3/04164; G06F 3/04166; G06F 3/0446
See application file for complete search history.

(56) References Cited

U.S. PATENT DOCUMENTS

2005/0253948 A1 11/2005 Nam et al.
2013/0257745 A1 10/2013 Reynolds
(Continued)

FOREIGN PATENT DOCUMENTS

DE 112017007864 T5 5/2020
JP 6156886 B2 7/2017
(Continued)

OTHER PUBLICATIONS

International Search Report, dated Jan. 10, 2023, for International Patent Application No. PCT/JP2022/038819. (6 pages)(with English Translation).

Primary Examiner — Rodney Amadiz
(74) Attorney, Agent, or Firm — Seed Intellectual Property Law Group LLP

(57) ABSTRACT

The present disclosure relates to a sensor controller including transmission drivers each having a negative and a positive power supply terminal, each of the transmission drivers being configured to generate a signal waveform transitioning between first potential and second potential and output the signal waveform to a corresponding detection electrode, and an intermediate potential supply unit having a potential generation circuit that includes a voltage source or a capacitive element separate from the transmission drivers, the intermediate potential supply unit being configured to output a voltage from the potential generation circuit at first timings at which a potential of a signal waveform starts to transition from the first potential to the second potential or from the second potential to the first potential, to supply the intermediate potential between the first potential and the second potential to at least one of the positive or the negative power supply terminal.

13 Claims, 17 Drawing Sheets

(56) References Cited

U.S. PATENT DOCUMENTS

2019/0146602 A1    5/2019  Kadowaki et al.
2019/0384446 A1   12/2019  Chang et al.
2020/0257429 A1*   8/2020  Hisano ................ G06F 3/04184

FOREIGN PATENT DOCUMENTS

JP        2019-91442 A    6/2019
WO        2013148104 A1  10/2013

* cited by examiner

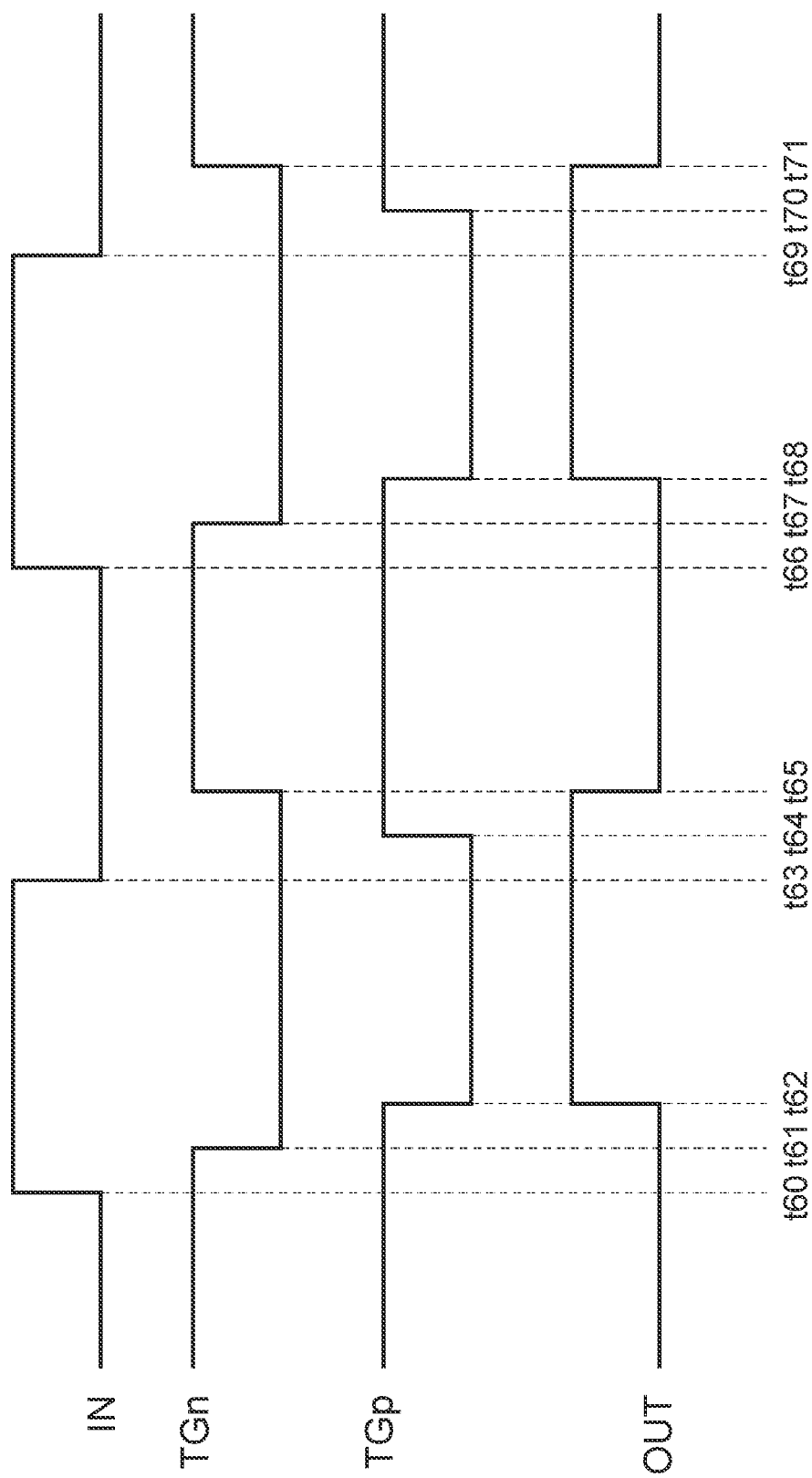

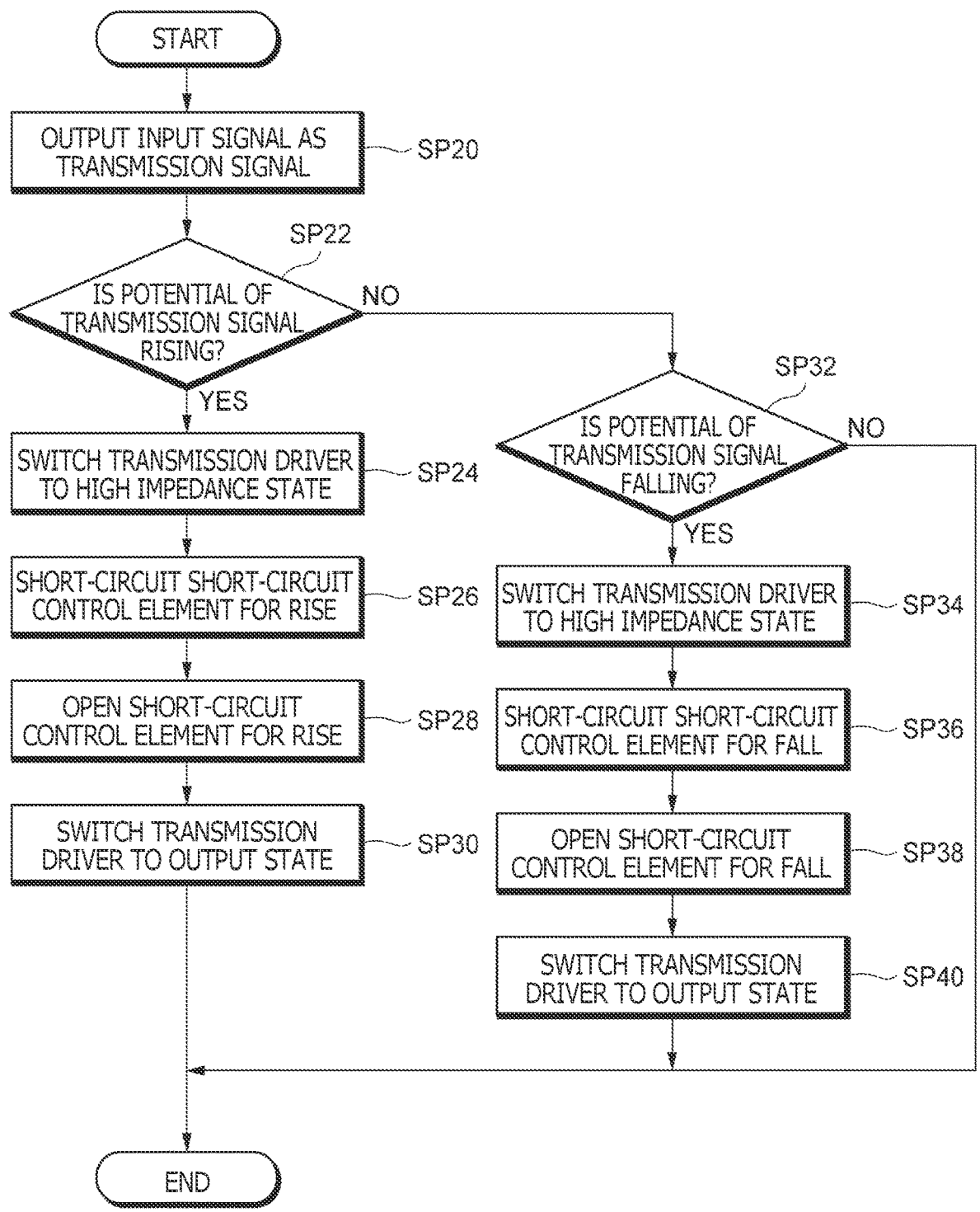

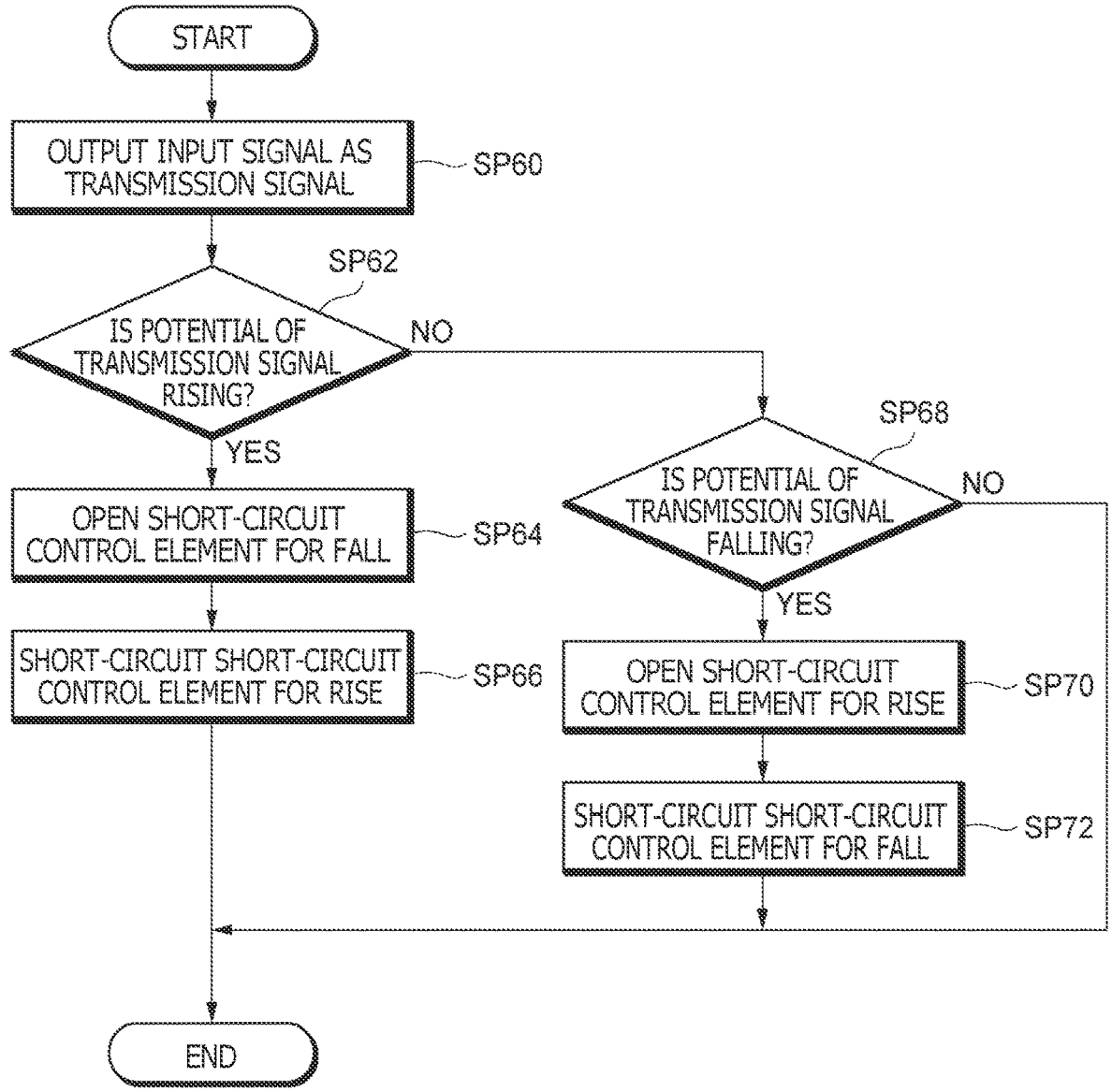

SENSOR CONTROLLER, ELECTRONIC DEVICE, AND CONTROL METHOD OF SENSOR CONTROLLER

BACKGROUND

Technical Field

The present disclosure relates to a sensor controller, and particularly to a sensor controller connected to a touch sensor, an electronic device, and a control method of the sensor controller.

Description of the Related Art

Conventionally, a technique (what is generally called an adiabatic drive technique) for reducing the power consumption of a circuit including a plurality of transmission drivers arranged in parallel is known, in which the power consumption is reduced by using a control signal to short-circuit output signal lines of the transmission drivers for a predetermined period and gradually shifting the potential of the output signal lines from a high level to a low level through intermediate potential that is potential between the high level and the low level or from the low level to the high level through the intermediate potential.

In relation to this, a tablet terminal is disclosed in Japanese Patent Laid-Open No. 2019-091442, the tablet terminal including a plurality of sensor electrodes, output signal lines corresponding to the sensor electrodes and connected to the sensor electrodes, switches corresponding to the output signal lines, each of the switches having one end thereof connected to the output signal line and another end thereof connected to a short-circuit line, and a control signal line for controlling the switches.

In addition, a processing system is disclosed in Japanese Patent No. 6156886, the processing system including a driver module including a transmitter electrode, and an electronic storage apparatus configured to drive the transmitter electrode from intermediate potential to second potential, the intermediate potential being between first potential and the second potential, and configured to drive the transmitter electrode to the intermediate potential.

In Japanese Patent Laid-Open No. 2019-091442 and Japanese Patent No. 6156886, the tablet terminal controls the switches to short-circuit the output signal lines or connect the output signal lines to the electronic storage apparatus for a certain period at a timing at which the potential of the sensor electrodes transitions from the high level to the low level or from the low level to the high level. The tablet terminal supplies charge from the output signal lines with potential in high level to the output signal lines with potential in low level through the short-circuit line or the electronic storage apparatus. In this way, the power consumption is reduced.

PRIOR ART DOCUMENT

Patent Document

Patent Document 1: Japanese Patent Laid-Open No. 2019-091442
Patent Document 2: Japanese Patent No. 6156886

BRIEF SUMMARY

Technical Problem

However, the switches are connected to the output signal lines in the techniques described in Japanese Patent Laid-Open No. 2019-091442 and Japanese Patent No. 6156886, and the parasitic capacitance or the like of the switches may affect transmission signals.

The present disclosure has been made in view of such a problem, and an object of the present disclosure is to provide a sensor controller, an electronic device, and a control method of the sensor controller that can reduce the power consumption without connecting elements, such as switches, to output signal lines.

Technical Solution

To solve the problem, a first aspect of the present disclosure provides a sensor controller connected to a touch sensor having a plurality of detection electrodes, the sensor controller including a plurality of transmission drivers each having a positive power supply terminal supplied with a first potential and a negative power supply terminal supplied with a second potential higher than the first potential, wherein each of the plurality of transmission drivers, in operation, generates a signal waveform that transitions between the first potential the second potential and outputs the signal waveform as a transmission signal to the corresponding detection electrodes, and an intermediate potential supply unit having a potential generation circuit that includes a voltage source or a capacitive element separate from the transmission drivers, wherein the intermediate potential supply unit, in operation, outputs a voltage from the potential generation circuit at first timings, at which the potential of the signal waveform starts to transition from the first potential to the second potential or from the second potential to the first potential, to thereby supply intermediate potential between the first potential and the second potential to at least one of the positive power supply terminal and the negative power supply terminal.

In addition, a second aspect of the present disclosure provides a sensor controller connected to a touch sensor having a plurality of detection electrodes, the sensor controller including a plurality of transmission drivers each having a negative power supply terminal supplied with a first potential and a positive power supply terminal supplied with a second potential higher than the first potential, wherein each of the plurality of transmission drivers, in operation, generates a signal waveform that transitions between the first potential and the second potential and output the signal waveform as a transmission signal to one of the corresponding one of the detection electrodes, and an intermediate potential supply unit that, in operation, generates an intermediate potential between the first potential and the second potential, supplies the intermediate potential to at least one of the positive power supply terminal and the negative power supply terminal of at least one of the transmission drivers in a period from a time point that the potential of the signal waveform generated by the at least one of the transmission drivers starts to transition from the first potential to the second potential or from the second potential to the first potential to a time point that the potential of the positive power supply terminal and the negative power supply terminal of the at least one of the transmission drivers reaches the intermediate potential, and stops supplying the intermediate potential at a timing at which the potential of at least one of the positive power supply terminal and the negative power supply terminal of the at least one of the transmission driver reaches the intermediate potential.

In addition, a third aspect of the present disclosure provides an electronic device including a touch sensor having a plurality of detection electrodes, and a sensor controller connected to the touch sensor, the sensor controller including a plurality of transmission drivers each having a negative power supply terminal supplied with a first potential and a positive power supply terminal supplied with a second potential higher than the first potential, wherein each of the plurality of transmission drivers, in operation, generates a signal waveform that transitions between the first potential and the second potential and outputs the signal waveform as a transmission signal to a corresponding one of the detection electrodes, and an intermediate potential supply unit having a potential generation circuit that includes a voltage source or a capacitive element separate from the transmission drivers, the intermediate potential supply unit, in operation, outputs a voltage from the potential generation circuit at first timings at which a potential of the signal waveform generated by at least one of the transmission drivers starts to transition from the first potential to the second potential or from the second potential to the first potential, and supplies the intermediate potential between the first potential and the second potential to at least one of the positive power supply terminal and the negative power supply terminal of at least one of the transmission drivers.

In addition, a fourth aspect of the present disclosure provides an electronic device including a touch sensor having a plurality of detection electrodes, and a sensor controller connected to the touch sensor, the sensor controller including a plurality of transmission drivers each having a negative power supply terminal supplied with a first potential and a positive power supply terminal supplied with a second potential higher than the first potential, wherein each of the plurality of transmission drivers, in operation, generates a signal waveform that transitions between the first potential and the second potential and outputs the signal waveform as a transmission signal to a corresponding one of the detection electrodes, and an intermediate potential supply unit that, in operation, generates an intermediate potential between the first potential and the second potential, supplies the intermediate potential to at least one of the positive power supply terminal or the negative power supply terminal of at least one of the transmission drivers in a period from a time point that a potential of the signal waveform generated by the at least one of the transmission drivers starts to transition from the first potential to the second potential or from the second potential to the first potential to a time point that the potential of the positive power supply terminal and the negative power supply terminal reaches the intermediate potential, and stops the supply of the intermediate potential at a timing at which the potential of at least one of the positive power supply terminal and the negative power supply terminal of the at least one of the transmission drivers reaches the intermediate potential.

In addition, a fifth aspect of the present disclosure provides a control method of a sensor controller connected to a touch sensor having a plurality of detection electrodes, the control method including generating, by a plurality of transmission drivers each having a negative power supply terminal supplied with a first potential and a positive power supply terminal supplied with a second potential higher than the first potential, a signal waveform that transition between the first potential and the second potential, outputting the signal waveform generated by each of the transmission drivers as a transmission signal to a corresponding one of the detection electrodes, outputting, from a potential generation circuit including a voltage source or a capacitive element separate from the transmission drivers, an intermediate potential between the first potential and the second potential at first timings at which a potential of the signal waveform generated by at least one of the transmission drivers starts to transition from the first potential to the second potential or from the second potential to the first potential, and supplying the intermediate potential to at least one of the positive power supply terminal and the negative power supply terminal of the at least one of the transmission drivers.

In addition, a sixth aspect of the present disclosure provides a control method of a sensor controller connected to a touch sensor having a plurality of detection electrodes, the control method including generating, by a plurality of transmission drivers each having a negative power supply terminal supplied with a first potential and a positive power supply terminal supplied with a second potential higher than the first potential, a signal waveform that transitions between the first potential and the second potential, outputting the signal waveform generated by each of the transmission drivers as a transmission signal to a corresponding one of the detection electrodes, generating an intermediate potential between the first potential and the second potential, supplying the intermediate potential to at least one of the positive power supply terminal or the negative power supply terminal of at least one of the transmission drivers in a period from a time point that a potential of the signal waveform generated by the at least one of the transmission drivers starts to transition from the first potential to the second potential or from the second potential to the first potential to a time point that the potential of the positive power supply terminal and the negative power supply terminal of the at least one of the transmission drivers reaches the intermediate potential, and stopping the supplying of the intermediate potential at a timing at which the potential of at least one of the positive power supply terminal and the negative power supply terminal of the at least one of the transmission drivers reaches the intermediate potential.

Advantageous Effect

According to the present disclosure, the power consumption can be reduced without connecting elements, such as switches, to the output signal lines.

BRIEF DESCRIPTION OF THE SEVERAL VIEWS OF THE DRAWINGS

FIG. 6 is a timing chart illustrating an example of transition of potential of each signal in the transmission driver.

FIG. 15 is a flow chart illustrating an example of a flow of a series of processes in the output circuits according to the first and second embodiments of the present disclosure.

FIG. 16 is a flow chart illustrating an example of a flow of a series of operations in the output circuits according to the third and fourth embodiments of the present disclosure.

DETAILED DESCRIPTION

Figure 1:
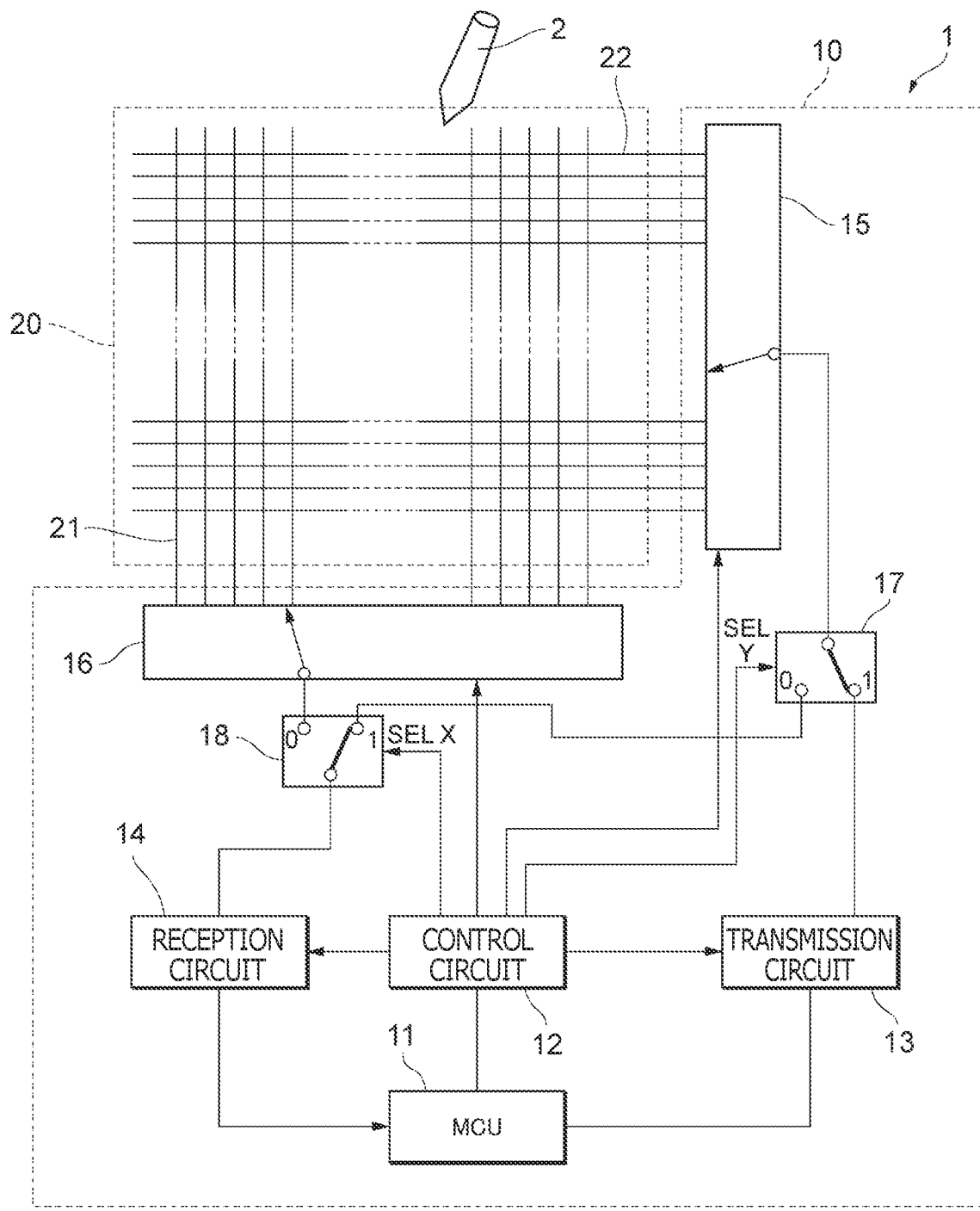
FIG. 1 is a diagram illustrating an example of an electronic device according to a first embodiment of the present disclosure.

Hereinafter, embodiments of the present disclosure (hereinafter, referred to as "present embodiments") will be described with reference to the attached drawings. To facilitate the understanding of the description, the same reference signs are provided as much as possible to the same constituent elements and acts in the drawings, and the description will not be repeated.

First Embodiment

First, a first embodiment will be described.
Circuit Configuration

FIG. 1 is a diagram illustrating an example of an electronic device 1 according to the first embodiment. The electronic device 1 is a computer possessed by a user, and the electronic device 1 includes, for example, a tablet, a smartphone, a personal computer, or the like. The user can hold a stylus 2, which is a pen-type pointing device, and move the stylus 2 while pressing its pen tip against a touch surface of the electronic device 1 to thereby draw a picture or a character on the electronic device 1. The stylus 2 is, for example, an electronic pen of the active electrostatic type (AES) and is capable of two-way communication with the electronic device 1.

The electronic device 1 detects an indicated position of the stylus 2 and executes various types of information processing according to the detection result. Specifically, the electronic device 1 transmits an uplink signal US to the stylus 2 and detects the indicated position of the stylus 2 according to a reception result of a downlink signal DS from the stylus 2 to execute a generation process of digital ink, a display process of a pointer, and the like. The electronic device 1 includes a sensor controller 10 and a touch sensor 20, in addition to a host processor, a memory, and a communication module (which are not illustrated).

The touch sensor 20 is a sensor of the capacitance type including a plurality of detection electrodes arranged in a plane shape. The touch sensor 20 includes, for example, a plurality of X line electrodes (hereinafter, referred to as "linear electrodes 21") for detecting a position on an X-axis in a sensor coordinate system and a plurality of Y line electrodes (hereinafter, referred to as "linear electrodes 22") for detecting a position on a Y-axis. The linear electrodes 21 and the linear electrodes 22 may contain a transparent conductive material including indium tin oxide (ITO) or may include wire mesh sensors. Note that the touch sensor 20 may be a sensor of the self-capacitance type including block-like electrodes arranged in a two-dimensional grid, instead of the sensor of the mutual capacitance type described above.

The sensor controller 10 includes a micro controller unit (MCU) 11, a control circuit 12, a transmission circuit 13, a reception circuit 14, an output circuit 15, a detection circuit 16, and selection circuits 17 and 18.

The output circuit 15 is a circuit that selects one of the plurality of linear electrodes 22 or a plurality of linear electrodes 22 adjacent to each other based on an instruction from the control circuit 12, amplifies an input signal transmitted from the control circuit 12 to a predetermined voltage, sets the signal as an output signal, and outputs the output signal to the linear electrode 22. In addition, the detection circuit 16 is a circuit that selects one of the plurality of linear electrodes 21 or a plurality of linear electrodes 21 adjacent to each other based on an instruction from the control circuit 12.

The selection circuit 17 is, for example, a multiplexer and is a circuit that makes a switch regarding whether to use the linear electrode 22 selected by the output circuit 15 to receive a signal or to use it to transmit a signal. The selection circuit 17 connects the linear electrode 22 selected by the output circuit 15 to the reception circuit 14 through the selection circuit 18 when a selection signal SELY output from the control circuit 12 is in a low state "0." On the other hand, the selection circuit 17 supplies, to the linear electrode 22 selected by the output circuit 15, an input signal input from the control circuit 12 through the transmission circuit 13 when the selection signal SELY is in a high state "1."

The selection circuit 18 is, for example, a multiplexer. The selection circuit 18 selects either a signal input through the selection circuit 17 from the linear electrode 22 selected by the output circuit 15 or a signal input from the linear electrode 21 selected by the detection circuit 16 and outputs the selected signal to the reception circuit 14. On the one hand, the selection circuit 18 connects the linear electrode 22 selected by the output circuit 15 to the reception circuit 14 when a selection signal SELX output from the control circuit 12 is in the low state. On the other hand, the selection circuit 18 connects the linear electrode 22 selected by the output circuit 15 through the selection circuit 17 to the reception circuit 14 when the selection signal SELX is in the high state.

The electronic device 1 has the following four types of modes, and the control circuit 12 controls each circuit in the sensor controller 10 while switching the modes in the following order. Hereinafter, the modes will be described in detail one by one.

A first mode is a mode for detecting the position of a finger. In this mode, the control circuit 12 shifts the selection signal SELY to the high state and shifts the selection signal SELX to the low state. That is, the transmission signal output from the control circuit 12 through the transmission circuit 13 and the output circuit 15 is supplied to the linear electrode 22 selected by the output circuit 15, and a touch detection signal is transmitted from the touch sensor 20. In addition, the linear electrode 21 selected by the detection circuit 16 is connected to the reception circuit 14. According to this configuration, the MCU 11 reads a change in the detection signal caused by contact of the finger with the sensor surface and calculates the coordinate position of the finger.

A second mode is a mode for transmitting the uplink signal US to the stylus 2. The control circuit 12 in this case shifts the selection signal SELY to the high state. As a result, the transmission signal output from the control circuit 12 through the transmission circuit 13 and the output circuit 15 is supplied to the linear electrode 22 selected by the output circuit 15, and the uplink signal US is transmitted from the touch sensor 20. In this case, the output circuit 15 may select, from the linear electrodes 22, an electrode near the position indicated by the stylus 2 and transmit the uplink signal US. Alternatively, the output circuit 15 may select all of the linear electrodes 22 at the same time and transmit a trigger signal US_trg.

A third mode is a mode for detecting a position signal DS_pos transmitted by the stylus 2 to detect the position of the stylus 2. The control circuit 12 in this case shifts the selection signal SELY to the low state, and the linear electrode 22 selected by the output circuit 15 is thus connected to the reception circuit 14 through the selection circuit 17. To obtain the X-axis coordinate of the stylus 2, the control circuit 12 shifts the selection signal SELX to the low state and connects the linear electrode 21 selected by the detection circuit 16 to the reception circuit 14. In this state, the MCU 11 reads, as signal level values, data output from the reception circuit 14 while sequentially selecting, one by one, a plurality of linear electrodes 21, for example, five linear electrodes 21, selected by the detection circuit 16, around the linear electrode 21 closest to the indicated position of the stylus 2. The MCU 11 calculates the X-axis coordinate of the stylus 2 based on the signal level distribution of the selected linear electrodes 21. In addition, to obtain the Y-axis coordinate of the stylus 2, the control circuit 12 shifts the selection signal SELX to the high state and connects the linear electrode 22 selected by the output circuit 15 to the reception circuit 14. In this state, the MCU 11 reads, as signal level values, data output from the reception circuit 14 while sequentially selecting, one by one, a plurality of linear electrodes 22, for example, five linear electrodes 22, selected by the output circuit 15, around the linear electrode 22 closest to the indicated position of the stylus 2. The MCU 11 calculates the Y-axis coordinate of the stylus 2 based on the signal level distribution of the selected linear electrodes 22.

A fourth mode is a mode for receiving a data signal DS_res transmitted by the stylus 2. Although either one of the linear electrode 21 and the linear electrode 22 may be used to receive the data signal DS_res, the case of using the linear electrode 21 to receive the data signal DS_res will be described here. The control circuit 12 shifts the selection signal SELX to the low state to connect the linear electrode 21 selected by the detection circuit 16 to the reception circuit 14. In addition, the control circuit 12 is operated in such a manner that the detection circuit 16 simultaneously selects a plurality of linear electrodes 21, for example, three linear electrodes 21, around the linear electrode 21 closest to the indicated position of the stylus 2. In this state, the MCU 11 periodically reads the output from the reception circuit 14. Note that, to use the linear electrode 22 to receive the data signal DS_res, the selection signal SELY can be shifted to the low state, and the selection signal SELX can be shifted to the high state.

This completes the description of the operation of the control circuit 12 in each mode. As can be understood from the description above, the electronic device 1 is configured to use the same touch sensor 20 to transmit and receive signals. Hereinafter, other components in the electronic device 1 illustrated in FIG. 1 will be described.

The MCU 11 is a microprocessor including a read only memory (ROM) and a random access memory (RAM) inside thereof and configured to operate based on a predetermined program. The MCU 11 controls the control circuit 12 to output each signal as described above and executes a reading process of digital data output by the reception circuit 14.

The control circuit 12 is a logic circuit that accurately outputs each signal at a designated timing based on an instruction from the MCU 11.

Figure 2:
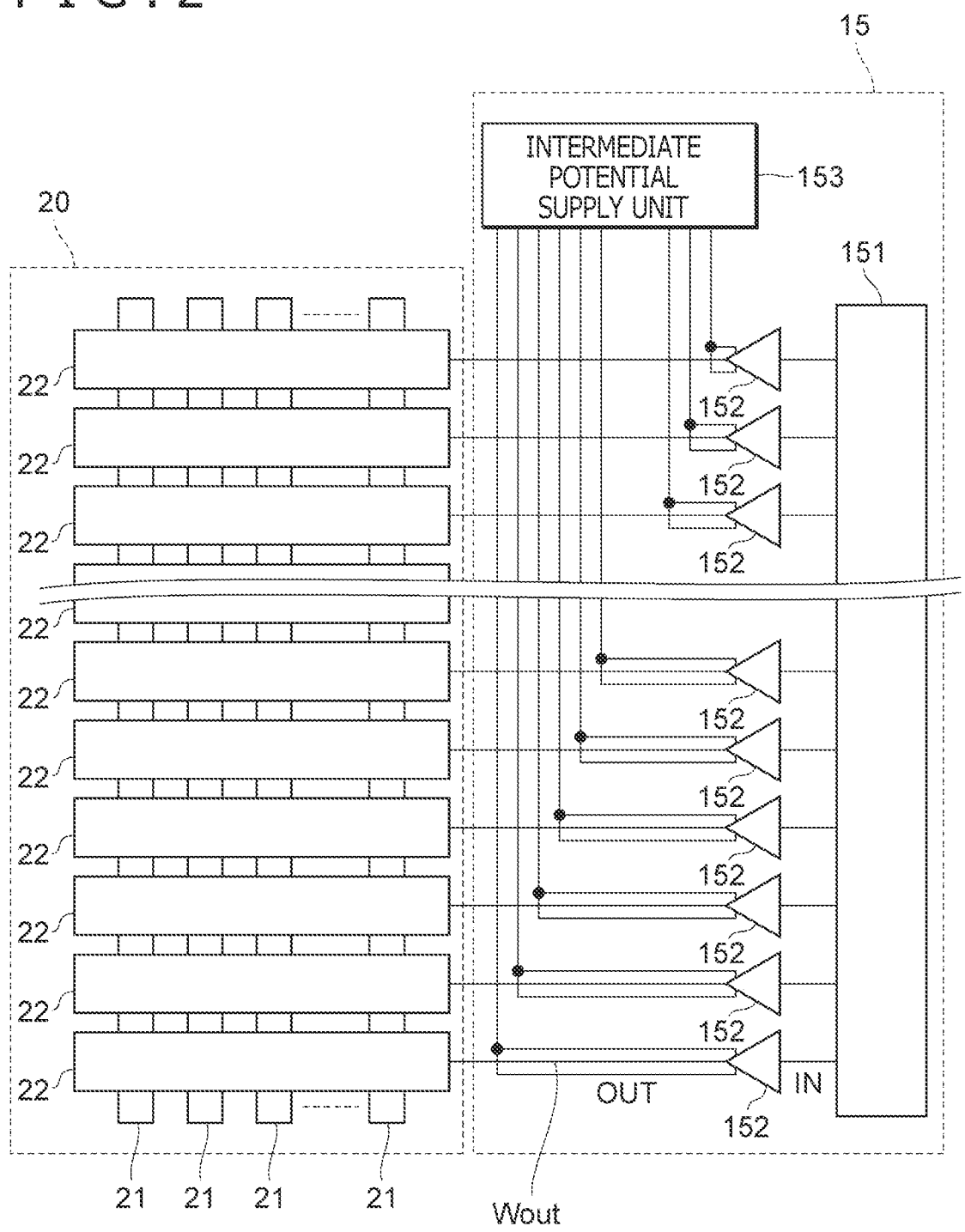
FIG. 2 is a diagram illustrating an example of part of a circuit configuration of an output circuit and a touch sensor.

This completes the description of the configuration and the operation of the electronic device 1. Next, a configuration of a circuit that functions when the output circuit 15 transmits a signal to the linear electrode 22 will be described in detail. FIG. 2 is a diagram illustrating an example of part of the circuit configuration of the output circuit 15 and the touch sensor 20 according to the present embodiment.

As illustrated in FIG. 2, the output circuit 15 includes a driver selection circuit 151, a plurality of transmission drivers 152, and an intermediate potential supply unit 153.

The driver selection circuit 151 selects some of the plurality of transmission drivers 152 that transmit signals to the linear electrodes 22 according to an instruction of the control circuit 12. The driver selection circuit 151 sets data signals transmitted from the transmission circuit 13 as a plurality of input signals IN and outputs the input signals IN to the corresponding transmission drivers 152.

One transmission driver 152 is provided for each linear electrode 22. The transmission driver 152 amplifies the input signal IN input from the driver selection circuit 151 to a signal with a potential difference that allows transmission of the signal from the linear electrode 22. The transmission driver 152 then sets the amplified signal as a transmission signal OUT and transmits the transmission signal OUT to the corresponding linear electrode 22 through an output signal line Wout. Here, the potential difference that allows transmission of the signal from the linear electrode 22 is a potential difference equal to or greater than 5 V, such as approximately 9 V, with a low level of, for example, 0 V (first potential) and a high level of equal to or greater than 5 V, such as approximately 9 V (second potential). In addition, the transmission driver 152 includes a positive power supply terminal supplied with positive power supply potential (high level) and a negative power supply terminal supplied with negative power supply potential (low level).

The intermediate potential supply unit 153 generates intermediate potential that is potential between the high level and the low level. Here, the intermediate potential is potential obtained by, for example, adding the values of the high level and the low level and dividing the resultant value by two. In addition, the intermediate potential supply unit 153 supplies the generated intermediate potential to the positive power supply terminal of the transmission driver 152 selected by the driver selection circuit 151, at a timing at which the potential of a signal waveform generated by the transmission driver 152 transitions from the low level to the high level. In addition, the intermediate potential supply unit 153 supplies the generated intermediate potential to the negative power supply terminal of the transmission driver 152 selected by the driver selection circuit 151, at a timing at which the potential of the signal waveform generated by the transmission driver 152 transitions from the high level to the low level. In addition, the intermediate potential supply unit 153 stops the supply of the intermediate potential to the transmission driver 152 at a timing at which the potential of the signal waveform generated by the transmission driver 152 to be provided with the intermediate potential reaches the intermediate potential.

Figure 3:
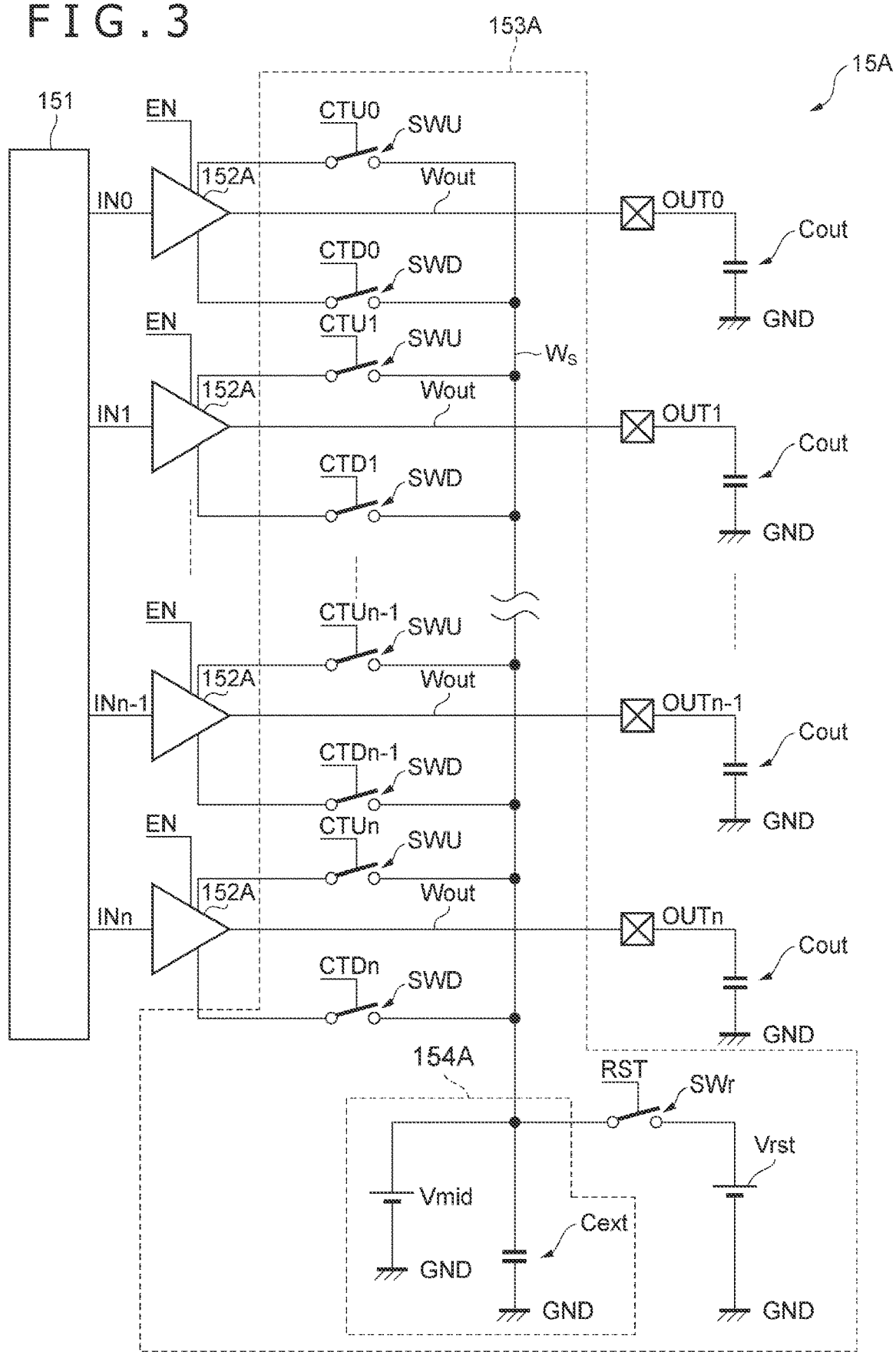
FIG. 3 is a diagram illustrating an example of a circuit configuration of an output circuit including an intermediate potential supply unit.

This completes the description of the configuration of the output circuit 15. Next, a configuration of a circuit of the intermediate potential supply unit 153 will be described in detail. FIG. 3 is a diagram illustrating an example of the circuit configuration of the output circuit 15 including an intermediate potential supply unit 153A according to the present embodiment.

As illustrated in FIG. 3, an output circuit 15A includes the driver selection circuit 151, a plurality of transmission drivers 152A, and the intermediate potential supply unit 153A. Note that, in FIG. 3, it is assumed that the driver selection circuit 151 selects n+1 transmission drivers 152A. Here, n is a positive integer. In addition, it is assumed that the linear electrode 22 includes a capacitive element Cout as load capacitance. The capacitance of the capacitive element Cout is, for example, approximately 1200 pF.

The driver selection circuit 151 selects n+1 transmission drivers 152A as described above and transmits the input signals IN to the selected transmission drivers 152A. Here, an input signal IN0 is input to a 0th transmission driver 152A. In addition, an input signal IN1 is input to a first transmission driver 152A. An input signal INn−1 is input to an nth transmission driver 152A. An input signal INn is input to an (n+1)th transmission driver 152A.

The transmission driver 152A is a driver in which an output control function is added to the transmission driver 152 described above. The transmission driver 152A sets the mode to an output mode or a stop mode according to an output control signal EN output from the control circuit 12. On the one hand, the transmission driver 152A in the output mode amplifies the input signal IN to a signal with a potential difference that allows transmission of the signal from the linear electrode 22. The transmission driver 152A then sets the amplified signal as the transmission signal OUT and transmits the transmission signal OUT to the corresponding linear electrode 22 through the output signal line Wout. On the other hand, the transmission driver 152A in the stop mode sets the state of output to a high impedance state "Hi-Z" and stops the transmission of the transmission signal OUT.

The intermediate potential supply unit 153A includes a potential generation circuit 154A, a plurality of short-circuit control elements SWU, a plurality of short-circuit control elements SWD, a short-circuit control element SWr, a reset voltage source Vrst, and a short-circuit signal line Ws.

The potential generation circuit 154A includes, for example, a voltage source Vmid and a capacitive element Cext. The voltage source Vmid is, for example, a voltage source that generates the intermediate potential. The potential generation circuit 154A generates, for example, 4.5 V that is the intermediate potential, and applies the generated intermediate potential to the short-circuit signal line Ws. The capacitive element Cext is, for example, a capacitor with capacitance of approximately 1 uF. One end of the capacitive element Cext is connected to the short-circuit signal line Ws, and another end of the capacitive element Cext is connected to a reference line GND. The capacitive element Cext charges or discharges electricity according to the potential supplied to the short-circuit signal line Ws to stabilize the potential of the short-circuit signal line Ws. Note that, although the potential generation circuit 154A includes the voltage source Vmid and the capacitive element Cext in the present embodiment, the potential generation circuit 154A may include only one of the voltage source Vmid and the capacitive element Cext.

The reset voltage source Vrst is a voltage source that generates initial potential (for example, 4.5 V), and supplies, to the short-circuit signal line Ws, the initial potential generated when the short-circuit control element SWr is short-circuited. One end of the reset voltage source Vrst is connected to another end of the short-circuit control element SWr, and another end of the reset voltage source Vrst is connected to the reference line GND.

The short-circuit control elements SWU, SWD, and SWr are, for example, switch elements or transistors. The short-circuit control elements SWU, SWD, and SWr short-circuit or open both ends according to an input signal. Specifically, on the one hand, the short-circuit control elements SWU, SWD, and SWr short-circuit both ends when the state of the input signal is the high state. On the other hand, the short-circuit control elements SWU, SWD, and SWr open both ends when the state of the input signal is the low state. In addition, the short-circuit control elements SWU and SWD are provided for each transmission driver 152A.

One end of the short-circuit control element SWr is connected to the short-circuit signal line Ws, and the other end of the short-circuit control element SWr is connected to the one end of the reset voltage source Vrst. The short-circuit control element SWr short-circuits or opens both ends according to a reset signal RST output from the control circuit 12.

One end of the short-circuit control element SWU is connected to the positive power supply terminal of the corresponding transmission driver 152A, and another end of the short-circuit control element SWU is connected to the short-circuit signal line Ws. The short-circuit control element SWU short-circuits or opens both ends according to a control signal CTU output from the control circuit 12.

One end of the short-circuit control element SWD is connected to the negative power supply terminal of the corresponding transmission driver 152A, and another end of the short-circuit control element SWD is connected to the short-circuit signal line Ws. The short-circuit control element SWD short-circuits or opens both ends according to a control signal CTD output from the control circuit 12.

In the output circuit 15A configured in this way, the control circuit 12 controls the state of the transmission driver 152A to the high impedance state and controls the short-circuit control element SWU to the short-circuit state at a timing at which the state of one of the input signals IN0 to INn transitions from the low state to the high state. In addition, the control circuit 12 controls the state of the transmission driver 152A to the high impedance state and controls the short-circuit control element SWD to the short-circuit state at a timing at which the state of one of the input signals IN0 to INn transitions from the high state to the low state. As a result, the positive power supply terminal of the transmission driver 152A corresponding to the input signal IN transitioning from the low state to the high state and the short-circuit signal line Ws are short-circuited, and the negative power supply terminal of the transmission driver 152A corresponding to the input signal IN transitioning from the high state to the low state and the short-circuit signal line Ws are short-circuited. Therefore, the potential is supplied from the output signal lines Wout with potential in high level to the output signal lines Wout with potential in low level and the capacitive element Cext through the short-circuit signal line Ws. In addition, the potential is supplied from the voltage source Vmid and the capacitive element Cext to the output signal lines Wout with potential in low level through the short-circuit signal line Ws.

Next, the control circuit 12 controls the state of the transmission driver 152A to the output state and controls the short-circuit control elements SWU and SWD to the open state at a timing at which the potential of the positive power supply terminal and the negative power supply terminal of each transmission driver 152A, the short-circuit signal line Ws, and the one end of the capacitive element Cext reaches the intermediate potential. As a result, the corresponding transmission driver 152A shifts the potential of each output signal line Wout to the high level or the low level, and transmission signals OUT0, OUT1, OUTn−1, and OUTn are transmitted through the linear electrodes 22.

Figure 5A:
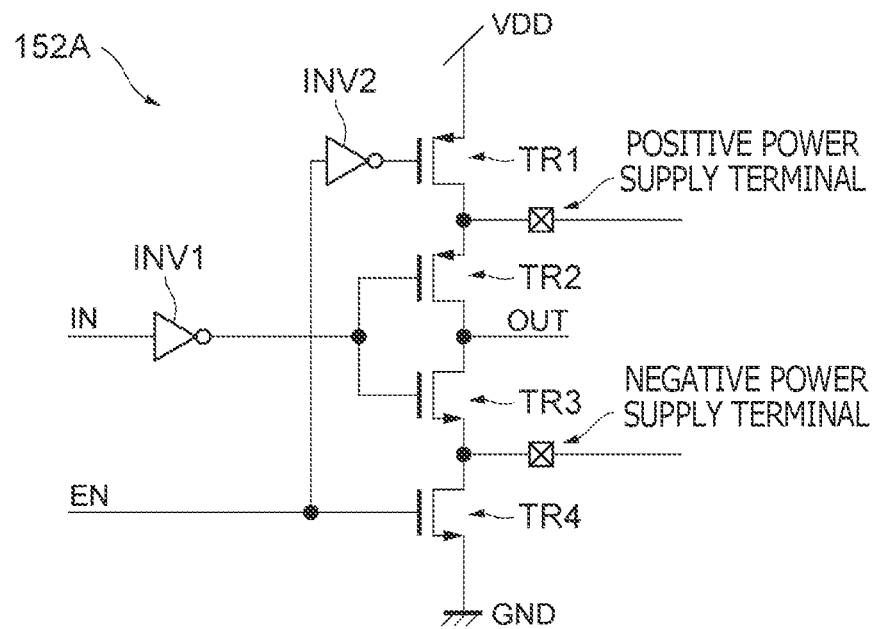
FIG. 5A is a diagram illustrating a first example of a circuit configuration of a transmission driver.

This completes the description of the configuration of the intermediate potential supply unit 153A. Next, a configuration of a circuit of the transmission driver 152 will be described in detail. FIG. 5A is a diagram illustrating an example of the circuit configuration of the transmission driver 152A according to the present embodiment. As illustrated in FIG. 5A, the transmission driver 152A includes, for example, NOT circuits INV1 and INV2, transistors TR1, TR2, TR3, and TR4, a power supply line VDD, and the reference line GND.

The NOT circuits INV1 and INV2 are inverter circuits including, for example, transistors. The NOT circuit INV1 performs a NOT operation of the input signal IN input from the driver selection circuit 151 and outputs the signal obtained after the operation to gate terminals of the transistors TR2 and TR3. In addition, the NOT circuit INV2 performs a NOT operation of the output control signal EN input from the control circuit 12 and outputs the signal obtained after the operation to a gate terminal of the transistor TR1.

The transistors TR1 and TR2 are, for example, p-type metal oxide semiconductor (MOS) transistors. The transistors TR1 and TR2 supply, to drain terminals, the potential supplied to source terminals or stops the supply, according to the signals input to the gate terminals. Specifically, the transistors TR1 and TR2 supply, to the drain terminals, the potential supplied to the source terminals when the state of the signals input to the gate terminals is the low state, and stops the supply when the state of the signals input to the gate terminals is the high state.

The gate terminal of the transistor TR1 is connected to an output terminal of the NOT circuit INV2. The source terminal of the transistor TR1 is connected to the power supply line VDD. The drain terminal of the transistor TR1 is connected to the positive power supply terminal of the transmission driver 152A.

The gate terminal of the transistor TR2 is connected to the output terminal of the NOT circuit INV1. The source terminal of the transistor TR2 is connected to the positive power supply terminal of the transmission driver 152A. The drain terminal of the transistor TR2 is connected to a drain terminal of the transistor TR3 and the output signal line Wout.

The transistors TR3 and TR4 are, for example, n-type MOS transistors. The transistors TR3 and TR4 discharge the electricity from drain terminals toward source terminals or stop the discharge, according to the signals input to gate terminals. Specifically, the transistors TR3 and TR4 discharge the electricity from the drain terminals toward source terminals when the state of the signals input to the gate terminals is the high state, and stops the discharge when the state of the signals input to the gate terminals is the low state.

The gate terminal of the transistor TR3 is connected to the output terminal of the NOT circuit INV1. The source terminal of the transistor TR3 is connected to the negative power supply terminal of the transmission driver 152A. The drain terminal of the transistor TR3 is connected to the drain terminal of the transistor TR2 and the output signal line Wout.

The gate terminal of the transistor TR4 is connected to the control circuit 12. The source terminal of the transistor TR4 is connected to the reference line GND. The drain terminal of the transistor TR4 is connected to the negative power supply terminal of the transmission driver 152A.

The power supply line VDD supplies, to the transmission driver 152A, potential in high level supplied from a voltage source not illustrated. Here, the potential in high level is potential equal to or greater than 5 V, for example, approximately 9 V. In addition, the reference line GND supplies potential in low level to the transmission driver 152A. Here, the potential in low level is, for example, potential of 0 V.

In the output mode in which the state of the output control signal EN is the low state, the transmission driver 152A configured in this way amplifies the input signal IN to a signal with a potential difference that allows transmission of the signal from the linear electrode 22. The transmission driver 152A then sets the amplified signal as the transmission signal OUT and transmits the transmission signal OUT to the output signal line Wout. On the other hand, in the stop mode in which the state of the output control signal EN is the high state, the transmission driver 152A sets the state of output to the high impedance state "Hi-Z" and stops the transmission of the transmission signal OUT.

Figure 5B:
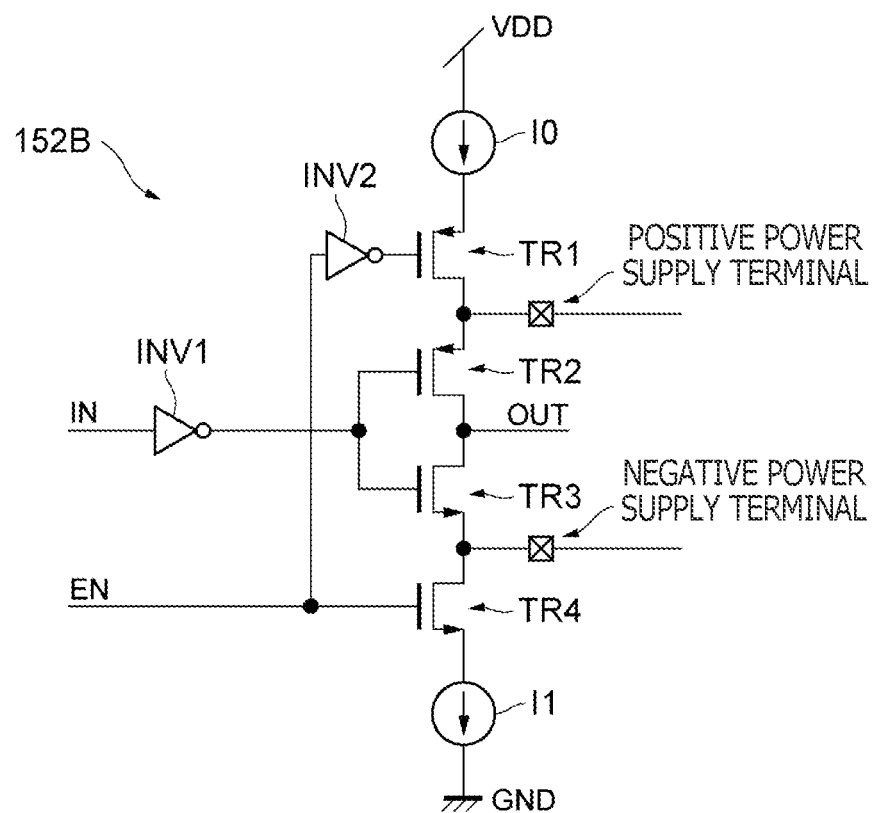
FIG. 5B is a diagram illustrating a second example of the circuit configuration of the transmission driver.

FIG. 5B is a diagram illustrating another example of the circuit configuration of the transmission driver 152 according to the present embodiment. As illustrated in FIG. 5B, a transmission driver 152B includes, for example, current sources I0 and I1 in addition to the components of the transmission driver 152A. In the description of the circuit configuration of the transmission driver 152B, the description of components similar to the components of the transmission driver 152A will not be repeated.

The current sources I0 and I1 are, for example, current mirror circuits including MOS transistors. The current source I0 restricts, to a constant current value, the current flowing from the power supply line VDD toward the source terminal of the transistor TR1. The current source I1 restricts, to a constant current value, the current flowing from the source terminal of the transistor TR4 toward the reference line GND.

The transmission driver 152B configured in this way restricts, to a constant current value, the current flowing from the power supply line VDD to the transmission driver 152B and the current flowing from the transmission driver 152B to the reference line GND to thereby make the transition of the potential of the transmission signal OUT more gradual than that in the transmission driver 152A. As a result, high frequency components of the transmission driver 152B are reduced, so that electromagnetic interference (EMI) characteristics of the transmission driver 152B are better than those of the transmission driver 152A.

Figure 5C:
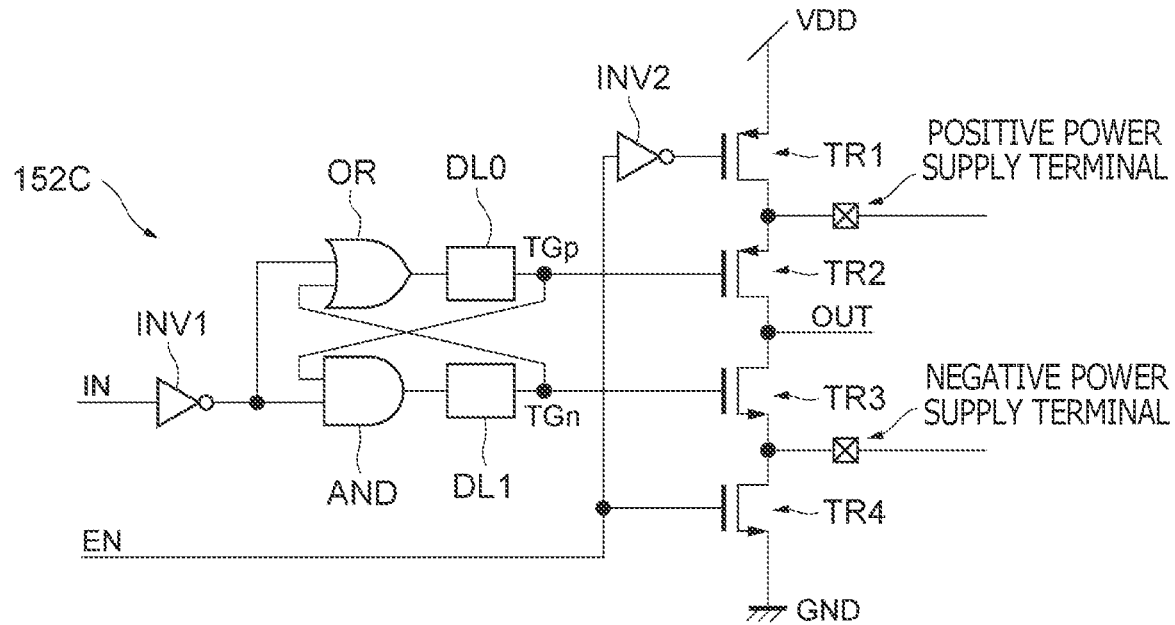
FIG. 5C is a diagram illustrating a third example of the circuit configuration of the transmission driver.

FIG. 5C is a diagram illustrating another example of the circuit configuration of the transmission driver 152 according to the present embodiment. As illustrated in FIG. 5C, a transmission driver 152C includes, for example, an OR circuit OR, an AND circuit AND, and delay circuits DL0 and DL1 in addition to the components of the transmission driver 152A. In the description of the circuit configuration of the transmission driver 152C, the description of components similar to the components of the transmission driver 152A will not be repeated.

The OR circuit OR includes, for example, a MOS transistor. The OR circuit OR performs an OR operation of an output signal of the NOT circuit INV1 and a trigger signal TGn output from the delay circuit DL1 and outputs the result of the operation to the delay circuit DL0.

The AND circuit AND includes, for example, a MOS transistor. The AND circuit AND performs an AND operation of an output signal of the NOT circuit INV1 and a trigger signal TGp output from the delay circuit DL0 and outputs the result of the operation to the delay circuit DL1.

The delay circuits DL0 and DL1 are, for example, buffer circuits including MOS transistors. The delay circuit DL0 delays an output signal of the OR circuit OR by a delay time period td. The delay circuit DL0 sets the delayed signal as the trigger signal TGp and outputs the trigger signal TGp to the gate terminal of the transistor TR2 and the AND circuit AND. The delay circuit DL1 delays an output signal of the AND circuit AND by the delay time period td. The delay circuit DL1 sets the delayed signal as the trigger signal TGn and outputs the trigger signal TGn to the gate terminal of the transistor TR3 and the OR circuit OR.

In the transmission driver 152C configured in this way, the OR circuit OR, the AND circuit AND, the drain terminal and the source terminal of the transistor TR2, and the drain terminal and the source terminal of the transistor TR3 do not enter the electrically connected state at the same time. This can prevent generation of a through current from the power supply line VDD to the reference line GND through the transistors TR1 to TR4.

FIG. 6 is a timing chart illustrating the transition of the potential of each signal in the transmission driver 152C according to the present embodiment. Note that, although not illustrated, it is assumed that the state of the output control signal EN is the high level at any time.

As illustrated in FIG. 6, the driver selection circuit 151 shifts the state of the input signal IN from the low state to the high state at a time t60. At the time t60, the NOT circuit INV1 performs the NOT operation of the input signal IN (high state) and outputs the signal switched to the low state as a result of the operation to the OR circuit OR and the AND circuit AND. At the time t60, the AND circuit AND performs the AND operation of the trigger signal TGp (high state) and the signal (low state) output from the NOT circuit INV1 and outputs the signal switched to the low state as a result of the operation to the delay circuit DL1.

At the time t60, the delay circuit DL1 receives the signal, switched to the low state, from the AND circuit AND and delays the signal by the delay time period td. At a time t61 after the delay time period td from the time t60, the delay circuit DL1 sets the delayed result as the trigger signal TGn and outputs the trigger signal TGn in the low state to the gate terminal of the transistor TR3 and the OR circuit OR. At the time t61, the transistor TR3 receives the trigger signal TGn in the low state and electrically disconnects the drain terminal and the source terminal. As a result, the drain terminal and the source terminal of the transistor TR2 are electrically disconnected, and the drain terminal and the source terminal of the transistor TR3 are electrically disconnected. Therefore, the state of the output signal line Wout is switched to the high impedance state.

At the time t61, the OR circuit OR performs the OR operation of the trigger signal TGn (low state) and the signal (low state) output from the NOT circuit INV1 and outputs the signal switched to the low state as a result of the operation to the delay circuit DL0.

At the time t61, the delay circuit DL0 receives the signal switched to the low state from the OR circuit OR and delays the signal by the delay time period td. At a time t62 after the delay time period td from the time t61, the delay circuit DL0 sets the delayed result as the trigger signal TGp and outputs the trigger signal TGp in the low state to the gate terminal of the transistor TR2 and the AND circuit AND. At the time t62, the transistor TR2 receives the trigger signal TGp in the low state and electrically connects the drain terminal and the source terminal. As a result, the potential in the high level is supplied from the power supply line VDD to the output signal line Wout through the transistors TR1 and TR2, and the potential of the transmission signal OUT transitions to the high level.

At a time t63, the driver selection circuit 151 shifts the state of the input signal IN from the high state to the low state. At the time t63, the NOT circuit INV1 performs the NOT operation of the input signal IN (low state) and outputs the signal switched to the high state as a result of the operation to the OR circuit OR and the AND circuit AND. At the time t63, the OR circuit OR performs the OR operation of the trigger signal TGn (low state) and the signal (high state) output from the NOT circuit INV1 and outputs the signal switched to the high state as a result of the operation to the delay circuit DL0.

At the time t63, the delay circuit DL0 receives the signal switched to the high state from the OR circuit OR and delays the signal by the delay time period td. At a time t64 after the delay time period td from the time t63, the delay circuit DL0 sets the delayed result as the trigger signal TGp and outputs the trigger signal TGp in the high state to the gate terminal of the transistor TR2 and the AND circuit AND. At the time t63, the transistor TR2 receives the trigger signal TGp in the high state and electrically disconnects the drain terminal and the source terminal. As a result, the drain terminal and the source terminal of the transistor TR2 are electrically disconnected, and the drain terminal and the source terminal of the transistor TR3 are electrically disconnected. Therefore, the state of the output signal line Wout is switched to the high impedance state.

At the time t64, the AND circuit AND performs the AND operation of the trigger signal TGp (high state) and the signal (high state) output from the NOT circuit INV1 and outputs the signal switched to the high state as a result of the operation to the delay circuit DL1. At the time t64, the delay circuit DL1 receives the signal switched to the high state from the AND circuit AND and delays the signal by the delay time period td. At a time t65 after the delay time period td from the time t64, the delay circuit DL1 sets the delayed result as the trigger signal TGn and outputs the trigger signal TGn in the high state to the gate terminal of the transistor TR3 and the OR circuit OR. At the time t65, the transistor TR3 receives the trigger signal TGn in the high state and electrically connects the drain terminal and the source terminal. As a result, the electricity is discharged from the output signal line Wout toward the reference line GND through the transistors TR1 and TR2, and the potential of the transmission signal OUT transitions to the low level.

Figure 5D:
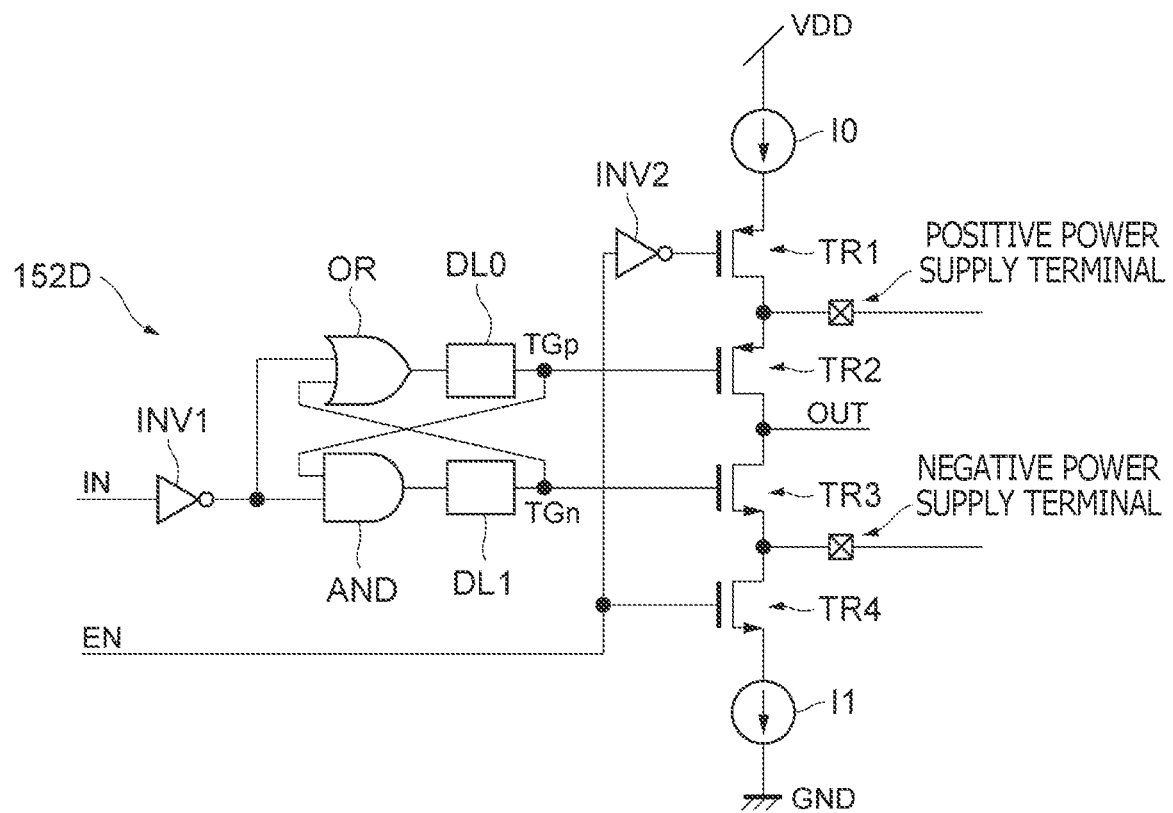
FIG. 5D is a diagram illustrating a fourth example of the circuit configuration of the transmission driver.

FIG. 5D is a diagram illustrating another example of the circuit configuration of the transmission driver 152 according to the first embodiment of the present disclosure. As illustrated in FIG. 5D, a transmission driver 152D includes the configuration of the transmission driver 152C added to the configuration of the transmission driver 152B. Therefore, the circuit configuration of the transmission driver 152D will not be described.

As illustrated in FIG. 5D, the transmission driver 152D includes the combination of the configurations of the transmission drivers 152B and 152C. Therefore, the high frequency components are reduced, and the EMI characteristics are better than those of the transmission driver 152A. This can also prevent the generation of a through current from the power supply line VDD to the reference line GND through the transistors TR1 to TR4.

Flow of Series of Operations Related to Output Circuit

Figure 4:
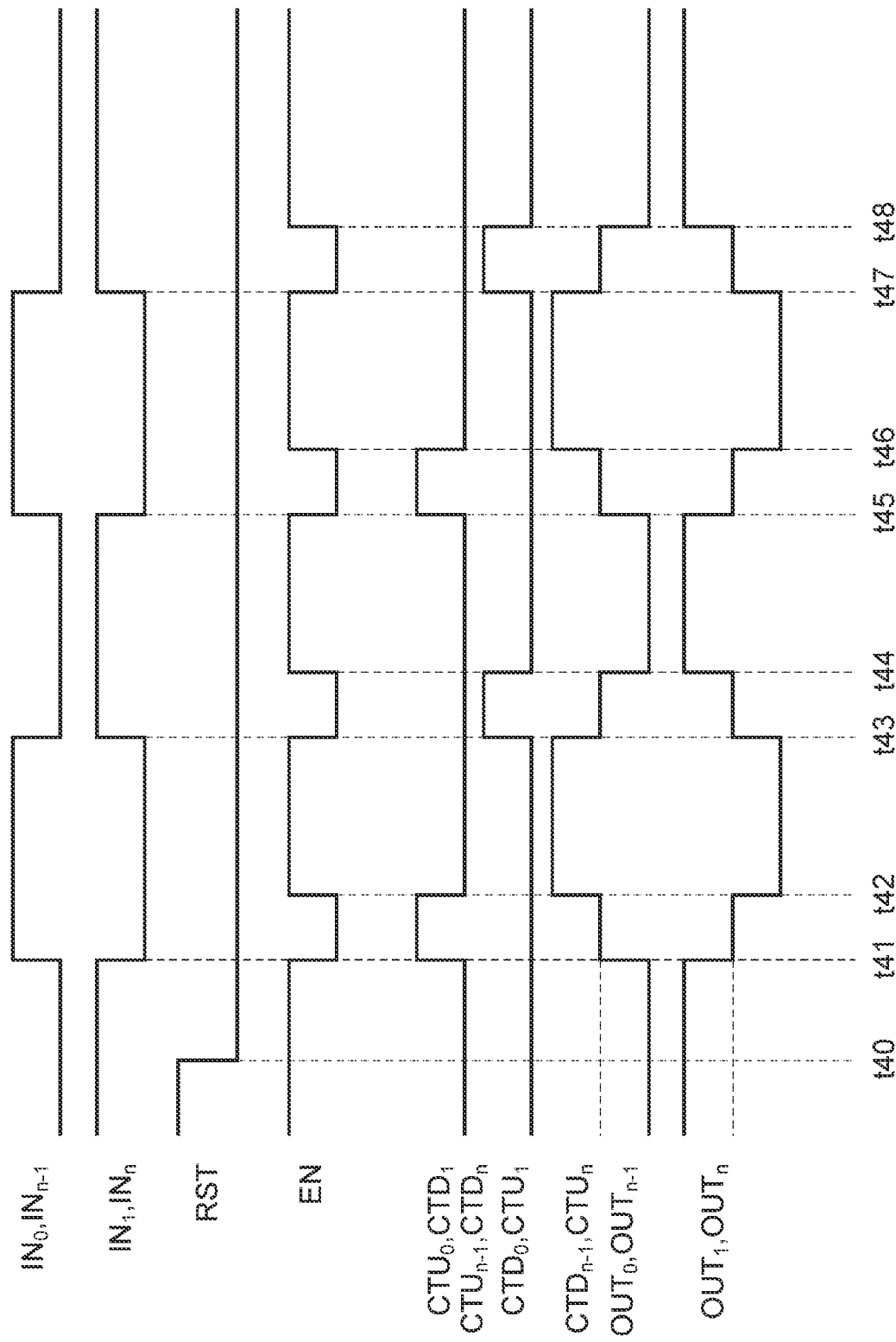
FIG. 4 is a timing chart illustrating an example of transition of potential of each signal in the output circuit.

This completes the description of the configuration of the transmission driver 152. Next, the transition of the potential of each signal in the output circuit 15A will be described in detail. FIG. 4 is a timing chart illustrating the transition of the potential of each signal in the output circuit 15A according to the present embodiment.

At a time t40, the control circuit 12 shifts the state of the reset signal RST to the low state to open both ends of the short-circuit control element SWr. This stops the supply of the initial potential from the reset voltage source Vrst to the short-circuit signal line Ws.

At a time t41, the driver selection circuit 151 shifts the state of the input signals IN0 and INn-1 from the low state to the high state and shifts the state of the input signals IN1 and INn from the high state to the low state. The driver selection circuit 151 inputs the input signals IN0, IN1, INn-1, and INn to the corresponding transmission drivers 152A.

At the time t41, the control circuit 12 shifts the state of the output control signal EN from the high state to the low state and sets the mode of each transmission driver 152A to the stop mode. In addition, at the time t41, the control circuit 12 shifts the state of control signals CTU0, CTUn-1, CTD1, and CTDn from the low state to the high state and outputs the control signals CTU0, CTUn-1, CTD1, and CTDn to the corresponding short-circuit control elements SWU or SWD to thereby short-circuit both ends of each of the short-circuit control elements SWU and SWD. As a result, the output signal lines Wout are short-circuited at the time t41 through the short-circuit control elements SWU and SWD in which both ends are short-circuited. At the time t41, the charge is supplied from the output signal lines Wout with potential in high level and the potential generation circuit 154A to the output signal lines Wout with potential in low level, and this shifts the potential of the transmission signals OUT0, OUT1, OUTn-1, and OUTn to the intermediate potential.

At a time t42, the control circuit 12 shifts the state of the output control signal EN from the low state to the high state and sets the mode of each transmission driver 152A to the output mode. In addition, at the time t42, the control circuit 12 shifts the state of the control signals CTU0, CTUn-1, CTD1, and CTDn from the high state to the low state and outputs the control signals CTU0, CTUn-1, CTD1, and CTDn to the short-circuit control elements SWU or SWD to thereby open both ends of each of the short-circuit control elements SWU and SWD. This releases the short-circuit state between the output signal lines Wout at the time t42. At the time t42, the charge is supplied from the corresponding transmission drivers 152A, so that the potential of the transmission signals OUT0 and OUTn-1 transitions from the intermediate potential to the high level. On the other hand, the electricity is discharged from the corresponding transmission drivers 152A, so that the potential of the transmission signals OUT1 and OUTn transitions from the intermediate potential to the low level.

At a time t43, the control circuit 12 shifts the state of the output control signal EN from the high state to the low state and sets the mode of each transmission driver 152A to the stop mode. In addition, at the time t43, the control circuit 12 shifts the state of control signals CTD0, CTDn-1, CTU1, and CTUn from the low state to the high state and outputs the control signals CTD0, CTDn-1, CTU1, and CTUn to the corresponding short-circuit control elements SWU or SWD to thereby open both ends of each of the short-circuit control elements SWU and SWD. As a result, the potential of the transmission signals OUT0, OUT1, OUTn-1, and OUTn is shifted to the intermediate potential at the time t43, as with the time t41.

At a time t44, the control circuit 12 shifts the state of the output control signal EN from the low state to the high state and sets the mode of each transmission driver 152A to the output mode. In addition, at the time t44, the control circuit 12 shifts the state of the control signals CTD0, CTDn-1, CTU1, and CTUn from the high state to the low state and outputs the control signals CTD0, CTDn-1, CTU1, and CTUn to the corresponding short-circuit control elements SWU or SWD to thereby open both ends of each of the short-circuit control elements SWU and SWD. As a result, the short-circuit state between the output signal lines Wout is released at the time t44. At the time t44, the charge is supplied from the corresponding transmission drivers 152A, so that the potential of the transmission signals OUT0 and OUTn-1 transitions from the intermediate potential to the low level. On the other hand, the electricity is discharged from the corresponding transmission drivers 152A, so that the potential of the transmission signals OUT1 and OUTn transitions from the intermediate potential to the high level.

This completes the description of the transition of the potential of each signal in the output circuit 15A. Next, a flow of a series of processes in the output circuit 15A will be described in detail. FIG. 15 is a flow chart illustrating the flow of the series of processes in the output circuit 15A according to the first embodiment.

SP20

The transmission driver 152A amplifies the input signal IN input from the driver selection circuit 151 to a signal with a potential difference that allows transmission of the signal from the linear electrode 22. The transmission driver 152A then sets the amplified signal as the transmission signal OUT and transmits the transmission signal OUT to the corresponding output signal line Wout. The process then moves to a process of SP22.

SP22

The control circuit 12 determines whether or not the signal waveform of the transmission signal OUT rises from the low level to the high level. On the one hand, if the determination is affirmative, the process moves to a process of SP24. On the other hand, if the determination is negative, the process moves to a process of SP32.

SP24

The control circuit 12 sets the mode of the transmission driver 152A to the stop mode. As a result, the state of output of the transmission driver 152A is switched to the high impedance state. The process then moves to a process of SP26.

SP26

The control circuit 12 controls both ends of each short-circuit control element SWU to short-circuit. As a result, the output signal lines Wout are short-circuited through the short-circuit signal line Ws, and the potential is supplied from the potential generation circuit 154A and the output signal lines Wout with potential in high level to the output signal lines Wout with potential in low level through the short-circuit signal line Ws. The potential of the short-circuit signal line Ws and the output signal lines Wout is shifted to the intermediate potential. The process then moves to a process of SP28. Note that, when there are a plurality of short-circuit signal lines Ws as described in a second embodiment described later, the control circuit 12 determines to which one of the short-circuit signal lines Ws each output signal line Wout is to be connected, and controls the short-circuit control element SWU corresponding to the determined short-circuit signal line Ws to short-circuit.

SP28

The control circuit 12 controls both ends of each short-circuit control element SWU to open. As a result, the short-circuit of the output signal lines Wout is released. The process then moves to a process of SP30.

SP30

The control circuit 12 sets the mode of the transmission driver 152A to the output mode. As a result, the high level is supplied from the transmission driver 152A to the output signal line Wout. The potential of the transmission signal OUT transitions from the intermediate potential to the high level according to the potential of the output signal line Wout.

SP32

The control circuit 12 determines whether or not the signal waveform of the transmission signal OUT falls from the high level to the low level. On the one hand, if the determination is affirmative, the process moves to a process of SP34. On the other hand, if the determination is negative, the process ends the series of processes in FIG. 15.

SP34

The control circuit 12 sets the mode of the transmission driver 152A to the stop mode. As a result, the state of output of the transmission driver 152A is switched to the high impedance state. The process then moves to a process of SP36.

SP36

The control circuit 12 controls both ends of each short-circuit control element SWD to short-circuit. As a result, the output signal lines Wout are short-circuited through the short-circuit signal line Ws, and the potential is supplied from the potential generation circuit 154A and the output signal lines Wout with potential in high level to the output signal lines Wout with potential in low level through the short-circuit signal line Ws. The potential of the short-circuit signal line Ws and the output signal lines Wout is shifted to the intermediate potential. The process then moves to a process of SP38. Note that, when there are a plurality of short-circuit signal lines Ws as described in the second embodiment described later, the control circuit 12 determines to which one of the short-circuit signal lines Ws each output signal line Wout is to be connected, and controls the short-circuit control element SWD corresponding to the determined short-circuit signal line Ws to short-circuit.

SP38

The control circuit 12 controls both ends of each short-circuit control element SWD to open. As a result, the short-circuit of the output signal lines Wout is released. The process then moves to a process of SP40.

SP40

The control circuit 12 sets the mode of the transmission driver 152A to the output mode. As a result, the low level is supplied from the transmission driver 152A to the output signal line Wout. The potential of the transmission signal OUT transitions from the intermediate potential to the low level according to the potential of the output signal line Wout.

Effects

As described above, the sensor controller 10 is connected to the touch sensor 20 having the plurality of linear electrodes 21 and 22 arranged in a plane shape in the present embodiment. The sensor controller 10 includes the plurality of transmission drivers 152A each having the positive power supply terminal and the negative power supply terminal, the plurality of transmission drivers 152A being configured to generate the signal waveform transitioning between the first potential (low level) supplied to the negative power supply terminal and the second potential (high level), which is potential higher than the first potential, supplied to the positive power supply terminal and output the signal waveform as a transmission signal to the corresponding linear electrodes 22, and the intermediate potential supply unit 153A having the potential generation circuit 154A that includes the voltage source Vmid or the capacitive element Cext separate from the transmission drivers 152A, the intermediate potential supply unit 153A being configured to output a voltage from the potential generation circuit 154A at first timings (times t41, t43, t45, and t47) at which the potential of the signal waveform starts to transition from the first potential (low level) to the second potential (high level) or from the second potential (high level) to the first potential (low level), to thereby supply the intermediate potential between the first potential (low level) and the second potential (high level) to at least one of the positive power supply terminal and the negative power supply terminal.

According to the configuration, the sensor controller 10 can output the intermediate potential to at least one of the positive power supply terminal and the negative power supply terminal of each transmission drivers 152A from the intermediate potential supply unit 153A having the potential generation circuit 154A that includes the voltage source Vmid or the capacitive element Cext separate from the transmission drivers 152A, to thereby stably supply the intermediate potential to at least one of the positive power supply terminal and the negative power supply terminal of the transmission driver 152A at necessary timings. Therefore, according to the present disclosure, the sensor controller 10 can reduce the power consumption more than in the conventional configuration, without connecting elements, such as switches, to the output signal lines Wout.

Further, in the present embodiment, an output side of the potential generation circuit 154A is connected to two or more of the plurality of transmission drivers 152A.

According to the configuration, the sensor controller 10 can suppress the through current and reduce the power consumption more than in the conventional configuration.

Further, the sensor controller 10 in the present embodiment includes the control circuit 12 that transmits the control signals CTU and CTD. In addition, the transmission driver 152A has the output mode for outputting the transmission signal OUT and the stop mode for stopping the supply of the second potential (high level) from the power supply line VDD to the positive power supply terminal and the supply of the first potential (low level) from the reference line GND to the negative power supply terminal to shift the state of output to the high impedance state. In addition, the control circuit 12 controls the transmission driver 152A to enter the stop mode at the first timings and controls the transmission driver 152A to enter the output mode at second timings (times t42, t44, t46, and t48) after a predetermined time period from the first timings.

According to the configuration, the sensor controller 10 can switch the state of output of each transmission driver 152A to the high impedance state and provide a period for stably supplying the intermediate potential from the intermediate potential supply unit 153A to each transmission driver 152A, to thereby reduce the power consumption.

Further, the intermediate potential supply unit 153A in the present embodiment includes the plurality of first short-circuit control elements SWU each having both ends short-circuited or opened according to the control signal CTU, the one end thereof being connected to the corresponding positive power supply terminal and the other end thereof being connected to the output side of the potential generation circuit 154A, and the plurality of second short-circuit control elements SWD each having both ends short-circuited or opened according to the control signal CTD, the one end thereof being connected to the corresponding negative power supply terminal and the other end thereof being connected to the output side of the potential generation circuit 154A. In addition, the control circuit 12 controls at least one of the first short-circuit control elements SWU and the second short-circuit control elements SWD to short-circuit at the first timings and controls at least one of the first short-circuit control elements SWU and the second short-circuit control elements SWD short-circuited at the first timings to open at the second timings.

According to the configuration, the sensor controller 10 can reduce the power consumption more than in the conventional configuration, without connecting elements, such as switches, to the output signal lines Wout.

Further, the control circuit 12 in the present embodiment short-circuits the first short-circuit control elements SWU at a timing at which the potential of the signal waveform starts to transition from the first potential (low level) to the second potential (high level) in the first timings, and short-circuits the second short-circuit control elements SWD at a timing at which the potential of the signal waveform starts to transition from the second potential (high level) to the first potential (low level) in the first timings.

According to the configuration, the sensor controller 10 can reduce the power consumption more than in the conventional configuration, without connecting elements, such as switches, to the output signal lines Wout.

Furthermore, in the present embodiment, the second potential (high level) is potential equal to or greater than 5 V, and the second potential (high level) is potential higher than the first potential (low level).

According to the configuration, the sensor controller 10 can reduce the power consumption even when the transmission drivers 152A driven with a voltage equal to or greater than 5 V are used.

Second Embodiment

This completes the description of the first embodiment. Next, the second embodiment will be described.

Circuit Configuration

Figure 7:
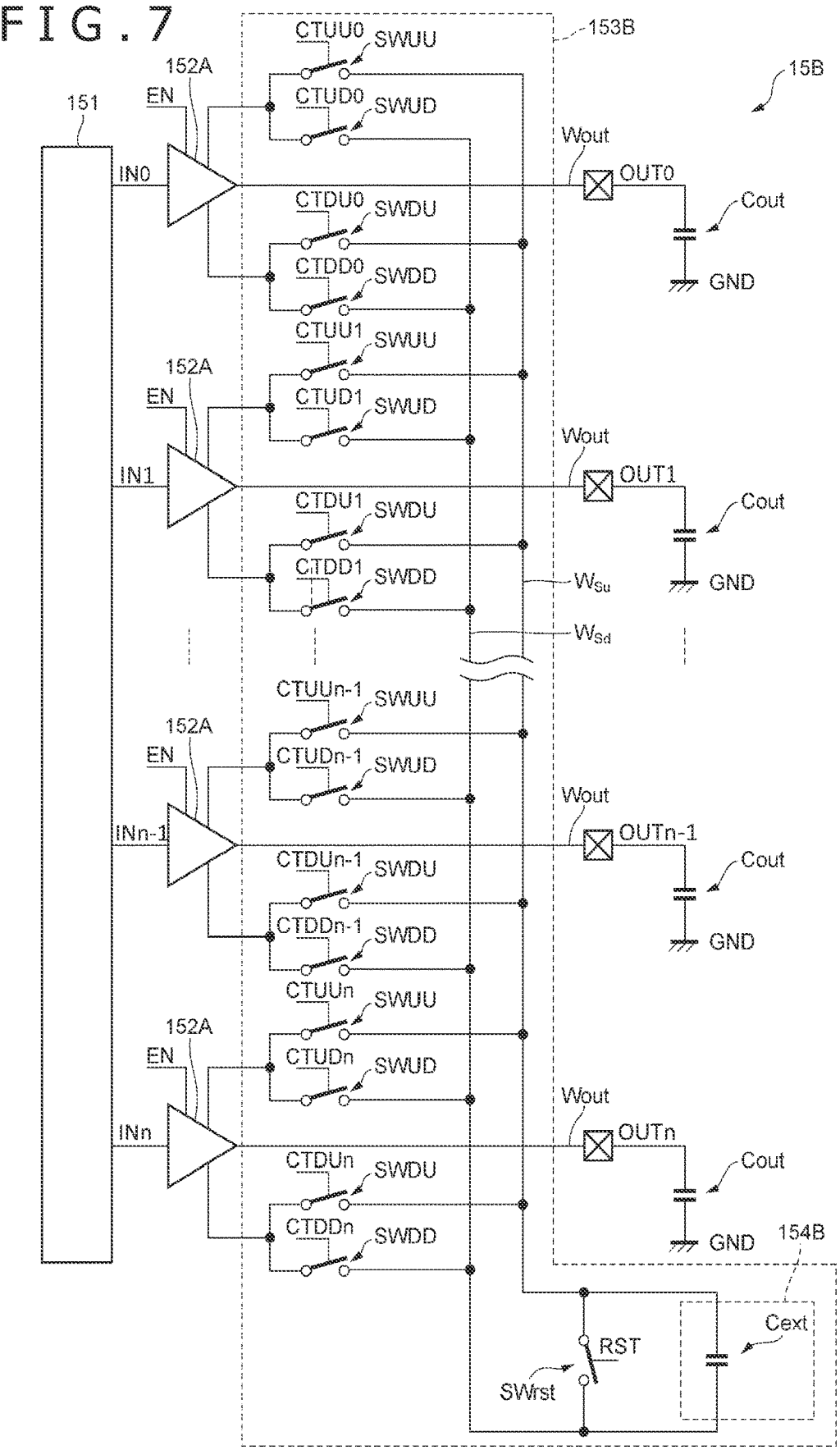
FIG. 7 is a diagram illustrating an example of a circuit configuration of an output circuit including an intermediate potential supply unit according to a second embodiment of the present disclosure.

FIG. 7 is a diagram illustrating an example of a circuit configuration of an output circuit 15B including an intermediate potential supply unit 153B according to the second embodiment.

As illustrated in FIG. 7, the output circuit 15B includes the driver selection circuit 151, the plurality of transmission drivers 152A, and the intermediate potential supply unit 153B. Note that, in FIG. 7, it is assumed that the driver selection circuit 151 selects n+1 transmission drivers 152A. In addition, it is assumed that the linear electrode 22 includes the capacitive element Cout as load capacitance. The capacitance of the capacitive element Cout is, for example, approximately 1200 pF.

The driver selection circuit 151 and the transmission drivers 152A are as described in the first embodiment, and the description will not be repeated.

The intermediate potential supply unit 153B includes a potential generation circuit 154B, the plurality of short-circuit control elements SWU and SWD, short-circuit signal lines Wsu and Wsd, the short-circuit control element SWr, and the capacitive element Cext.

The potential generation circuit 154B includes, for example, the capacitive element Cext. The capacitive element Cext is, for example, a capacitor with capacitance of approximately 1 uF. The one end of the capacitive element Cext is connected to the short-circuit signal line Wsu, and the other end of the capacitive element Cext is connected to the short-circuit signal line Wsd. The capacitive element Cext charges or discharges the electricity according to the potential difference between the potential supplied to the short-circuit signal line Wsu and the potential supplied to the short-circuit signal line Wsd to stabilize the potential of the short-circuit signal lines Wsu and Wsd.

Short-circuit control elements SWUU, SWUD, SWDU, SWDD, and SWr are, for example, switch elements or transistors. The short-circuit control elements SWUU, SWUD, SWDU, SWDD, and SWr short-circuit or open both ends according to the input signal. Specifically, on the one hand, the short-circuit control elements SWUU, SWUD, SWDU, SWDD, and SWr short-circuit both ends when the state of the input signal is the high state. On the other hand, the short-circuit control elements SWUU, SWUD, SWDU, SWDD, and SWr open both ends when the state of the input signal is the low state. In addition, the short-circuit control elements SWUU, SWUD, SWDU, and SWDD are provided for each transmission driver 152A.

The short-circuit control element SWr short-circuits or opens the short-circuit signal line Ws and the reset voltage source Vrst according to the reset signal RST output from the control circuit 12. The one end of the short-circuit control element SWr is connected to the short-circuit signal line Wsu, and the other end of the short-circuit control element SWr is connected to one end of the short-circuit signal line Wsd. The short-circuit control element SWr short circuits the short-circuit signal lines Wsu and Wds at the time of the short-circuit, and releases the short-circuit of the short-circuit signal lines Wsu and Wds at the time of the opening.

One end of the short-circuit control element SWUU is connected to the positive power supply terminal of the corresponding transmission driver 152A, and another end of the short-circuit control element SWUU is connected to the short-circuit signal line Wsu. The short-circuit control element SWUU short-circuits or opens both ends according to a control signal CTUU output for each short-circuit control element SWUU from the control circuit 12.

One end of the short-circuit control element SWUD is connected to the positive power supply terminal of the corresponding transmission driver 152A, and another end of the short-circuit control element SWUD is connected to the short-circuit signal line Wsd. The short-circuit control element SWUD short-circuits or opens both ends according to a control signal CTUD output for each short-circuit control element SWUD from the control circuit 12.

One end of the short-circuit control element SWDU is connected to the negative power supply terminal of the corresponding transmission driver 152A, and another end of the short-circuit control element SWDU is connected to the short-circuit signal line Wsu. The short-circuit control element SWDU short-circuits or opens both ends according to a control signal CTDU output for each short-circuit control element SWDU from the control circuit 12.

One end of the short-circuit control element SWDD is connected to the negative power supply terminal of the corresponding transmission driver 152A, and another end of the short-circuit control element SWDD is connected to the short-circuit signal line Wsd. The short-circuit control element SWDD short-circuits or opens both ends according to a control signal CTDD output for each short-circuit control element SWDD from the control circuit 12.

In the output circuit 15B configured in this way, the control circuit 12 controls the state of the transmission driver 152A to the high impedance state at the timing at which the state of one of the input signals IN0 to INn transitions from the high state to the low state or at the timing at which the state of one of the input signals IN0 to INn transitions from the low state to the high state. In addition, the control circuit 12 allocates a value corresponding to a code (for example, orthogonal code) to each transmission driver 152A and determines to which one of the short-circuit signal lines Wsu and Wsd the corresponding transmission driver 152A is to be connected. Specifically, the control circuit 12 determines to connect a transmission driver 152A to the short-circuit signal line Wsu when the value of the orthogonal code corresponding to the transmission driver 152A is "0," and determines to connect a transmission driver 152A to the short-circuit signal line Wsd when the value of the orthogonal code corresponding to the transmission driver 152A is "1," for example. Note that it is desirable that the number of values "0" and the number of values "1" included in the codes for determining the values allocated to the transmission drivers 152A be approximately the same.

The control circuit 12 controls, to the short-circuit state, the short-circuit control element SWUU corresponding to the transmission driver 152A determined to be connected to the short-circuit signal line Wsu and controls, to the short-circuit state, the short-circuit control element SWDU corresponding to the transmission driver 152A determined to be connected to the short-circuit signal line Wsd, at the timing at which the state of one of the input signals IN0 to INn transitions from the low state to the high state. In addition, the control circuit 12 controls, to the short-circuit state, the short-circuit control element SWUD corresponding to the transmission driver 152A determined to be connected to the short-circuit signal line Wsu and controls, to the short-circuit state, the short-circuit control element SWDD corresponding to the transmission driver 152A determined to be connected to the short-circuit signal line Wsd, at the timing at which the state of one of the input signals IN0 to INn transitions from the high state to the low state. Therefore, the output signal line Wout corresponding to the transmission driver 152A determined to be connected to the short-circuit signal line Wsu is short-circuited to the one end of the capacitive element Cext through the short-circuit signal line Wsu, and the output signal line Wout corresponding to the transmission driver 152A determined to be connected to the short-circuit signal line Wsd is short-circuited to the other end of the capacitive element Cext through the short-circuit signal line Wsd. As a result, the charge is exchanged between the output signal line Wout and the one end of the capacitive element Cext through the short-circuit signal line Wsu, and the charge is exchanged between the output signal line Wout and the other end of the capacitive element Cext through the short-circuit signal line Wsd. The potential of the output signal lines Wout, the potential of the short-circuit signal lines Wsu and Wsd, and the potential of both ends of the capacitive element Cext reach the intermediate potential.

Next, the control circuit 12 controls the state of the transmission driver 152A to the output state and controls the short-circuit control elements SWUU, SWUD, SWDU, and SWDD to the open state, at the timing at which the potential of each output signal line Wout, the short-circuit signal lines Wsu and Wsd, and both ends of the capacitive element Cext reaches the intermediate potential. As a result, the corresponding transmission driver 152A shifts the potential of each output signal line Wout to the high level or the low level, and the transmission signals OUT0, OUT1, OUTn−1, and OUTn are transmitted through the linear electrodes 22.

Flow of Series of Operations Related to Output Circuit

Figure 8:
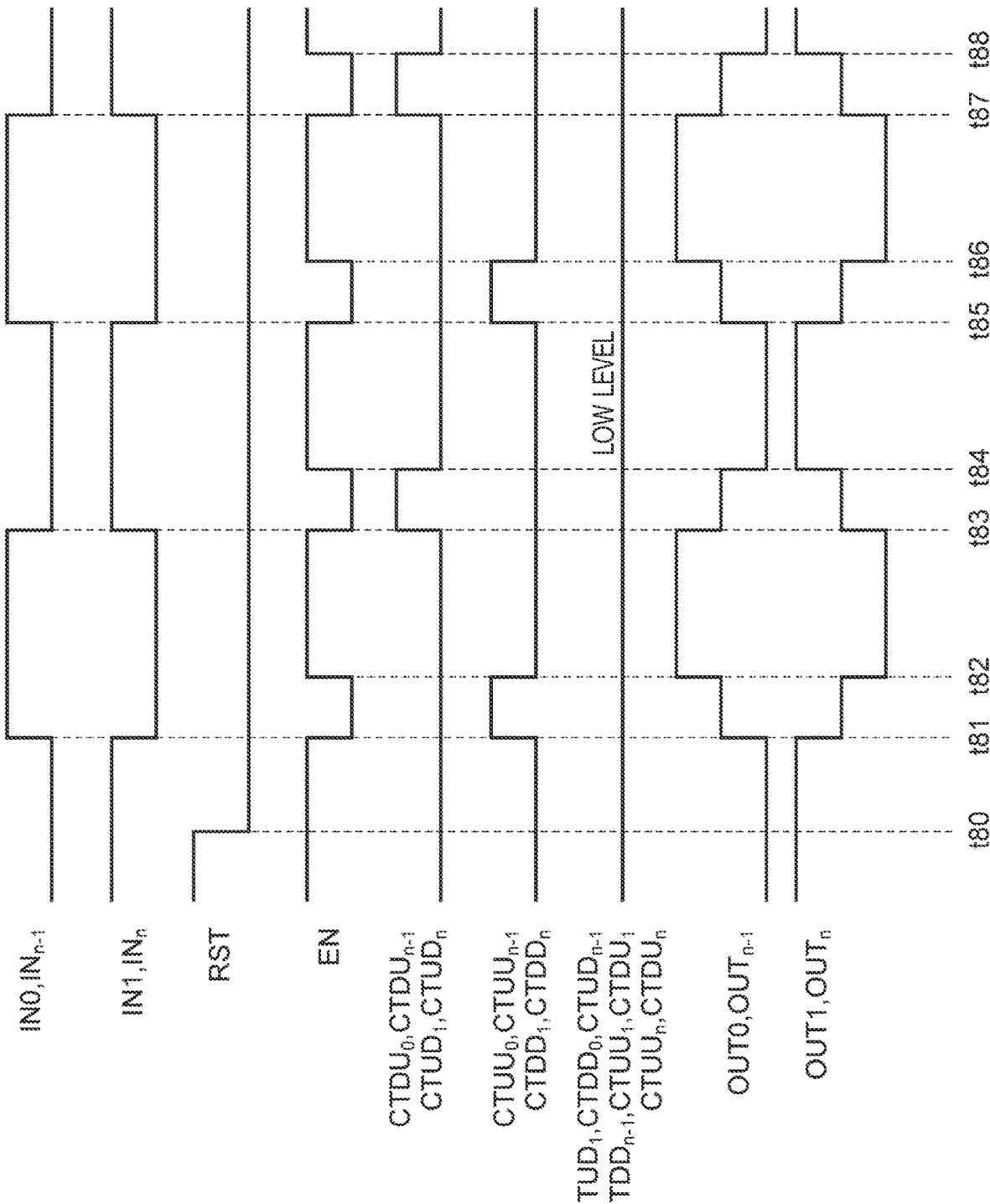
FIG. 8 is a timing chart illustrating transition of potential of each signal in the output circuit according to the second embodiment of the present disclosure.

This completes the description of the circuit configuration of the output circuit 15B. Next, the transition of the potential of each signal in the output circuit 15B will be described in detail. FIG. 8 is a timing chart illustrating the transition of the potential of each signal in the output circuit 15B according to the second embodiment. Note that, in FIG. 8, it is assumed that the control circuit 12 determines to connect the transmission drivers 152A corresponding to the transmission signals OUT0 and OUTn−1 to the short-circuit signal line Wsu and connect the transmission drivers 152A corresponding to the transmission signals OUT1 and OUTn to the short-circuit signal line Wsd.

At a time t80, the control circuit 12 switches the state of the reset signal RST to the low state to open both ends of the short-circuit control element SWr. As a result, the short-circuit state between the short-circuit signal lines Wsu and Wsd is released.

At a time t81, the driver selection circuit 151 shifts the state of the input signals IN0 and INn−1 from the low state to the high state and shifts the state of the input signals IN1 and INn from the high state to the low state. The driver selection circuit 151 inputs the input signals IN0, IN1, INn−1, and INn to the corresponding transmission drivers 152A.

At the time t81, the control circuit 12 shifts the state of the output control signal EN from the high state to the low state and sets the mode of each transmission driver 152A to the stop mode. In addition, at the time t81, the control circuit 12 shifts the state of control signals CTUU0, CTUUn−1, CTDD1, and CTDDn from the low state to the high state and outputs the control signals CTUU0, CTUUn−1, CTDD1, and CTDDn to short-circuit control elements SWUU0, SWUUn−1, SWDD1, and SWDDn to thereby short-circuit both ends of the short-circuit control elements SWUU0, SWUUn−1, SWDD1, and SWDDn.

As a result, at the time t81, the transmission drivers 152A corresponding to the transmission signals OUT0 and OUTn−1 are short-circuited to one end of the potential generation circuit 154B through the short-circuit control elements SWUU0 and SWUUn−1 in which both ends are short-circuited. In addition, at the time t81, the transmission drivers 152A corresponding to the transmission signals OUT1 and OUTn are short-circuited to another end of the potential generation circuit 154B through the short-circuit control elements SWDD1 and SWDDn in which both ends are short-circuited. At the time t81, the charge is supplied from the transmission drivers 152A corresponding to the transmission signals OUT1 and OUTn to the potential generation circuit 154B, and the charge is supplied from the potential generation circuit 154B to the transmission drivers 152A corresponding to the transmission signals OUT0 and OUTn−1. As a result, the potential of the transmission signals OUT0, OUT1, OUTn−1, and OUTn is shifted to the intermediate potential.

At a time 182, the control circuit 12 shifts the state of the output control signal EN from the low state to the high state and sets the mode of each transmission driver 152A to the output mode. In addition, at the time t82, the control circuit 12 shifts the state of the control signals CTUU0, CTUUn−1, CTDD1, and CTDDn from the high state to the low state and outputs the control signals CTUU0, CTUUn−1, CTDD1, and CTDDn to the short-circuit control elements SWUU0, SWUUn−1, SWDD1, and SWDDn to thereby open both ends of the short-circuit control elements SWUU0, SWUUn−1, SWDD1, and SWDDn. As a result, the short-circuit state between each transmission driver 152A and the potential generation circuit 154B is released at the time t82. At the time t82, the charge is supplied from the corresponding transmission drivers 152A, so that the potential of the transmission signals OUT0 and OUTn−1 transitions from the intermediate potential to the high level. On the other hand, the electricity is discharged from the corresponding transmission drivers 152A, so that the potential of the transmission signals OUT1 and OUTn transitions from the intermediate potential to the low level.

At a time t83, the driver selection circuit 151 shifts the state of the input signals IN0 and INn−1 from the high state to the low state and shifts the state of the input signals IN1 and INn from the low state to the high state. The driver selection circuit 151 inputs the input signals IN0, IN1, INn−1, and INn to the corresponding transmission drivers 152A.

At the time t83, the control circuit 12 shifts the state of the output control signal EN from the high state to the low state and sets the mode of each transmission driver 152A to the stop mode. In addition, at the time t83, the control circuit 12 shifts the state of control signals CTDU0, CTDUn−1, CTUD1, and CTUDn from the low state to the high state and outputs the control signals CTDU0, CTDUn−1, CTUD1, and CTUDn to short-circuit control elements SWDU0, SWDUn−1, SWUD1, and SWUDn to thereby short-circuit both ends of the short-circuit control elements SWDU0, SWDUn−1, SWUD1, and SWUDn.

As a result, at the time t83, the transmission drivers 152A corresponding to the transmission signals OUT0 and OUTn−1 are short-circuited to the one end of the potential generation circuit 154B through the short-circuit control elements SWDU0 and SWDUn−1 in which both ends are short-circuited. In addition, at the time t83, the transmission drivers 152A corresponding to the transmission signals OUT1 and OUTn are short-circuited to the other end of the potential generation circuit 154B through the short-circuit control elements SWUD1 and SWUDn in which both ends are short-circuited. At the time t83, the charge is supplied from the transmission drivers 152A corresponding to the transmission signals OUT0 and OUTn−1 to the potential generation circuit 154B, and the charge is supplied from the potential generation circuit 154B to the transmission drivers 152A corresponding to the transmission signals OUT1 and OUTn. As a result, the potential of the transmission signals OUT0, OUT1, OUTn−1, and OUTn is shifted to the intermediate potential.

At a time t84, the control circuit 12 shifts the state of the output control signal EN from the low state to the high state and sets the mode of each transmission driver 152A to the output mode. In addition, at the time t84, the control circuit 12 shifts the state of the control signals CTDU0, CTDUn−1, CTUD1, and CTUDn from the high state to the low state and outputs the control signals CTDU0, CTDUn−1, CTUD1, and CTUDn to the short-circuit control elements SWDU0, SWDUn−1, SWUD1, and SWUDn to thereby open both ends of the short-circuit control elements SWDU0, SWDUn−1, SWUD1, and SWUDn. As a result, the short-circuit state between each output signal line Wout and the potential generation circuit 154B is released at the time t84. At the time t84, the charge is supplied from the corresponding transmission drivers 152A, so that the potential of the transmission signals OUT1 and OUTn transitions from the intermediate potential to the high level. On the other hand, the electricity is discharged from the corresponding transmission drivers 152A, so that the potential of the transmission signals OUT0 and OUTn−1 transitions from the intermediate potential to the low level.

This completes the description of the transition of the potential of each signal in the output circuit 15B. Note that the flow of the series of processes in the output circuit 15B is similar to that of the first embodiment, and the description will not be repeated.

Effects

As described above, in the sensor controller 10 of the present embodiment, the potential generation circuit 154B includes the capacitive element Cext, and the intermediate potential supply unit 153B includes the first short-circuit signal line Wsu connected to the one end of the capacitive element Cext, the second short-circuit signal line Wsd connected to the other end of the capacitive element Cext, the plurality of first short-circuit control elements SWUU each having both ends short-circuited or opened according to the control signal CTUU, the one end thereof being connected to the positive power supply terminal of the corresponding transmission driver 152A and the other end thereof being connected to the first short-circuit signal line Wsu, the plurality of second short-circuit control elements SWUD each having both ends short-circuited or opened according to the control signal CTUD, the one end thereof being connected to the positive power supply terminal of the corresponding transmission driver 152A and the other end thereof being connected to the second short-circuit signal line Wsd, the plurality of third short-circuit control elements SWDU each having both ends short-circuited or opened according to the control signal CTDU, the one end thereof being connected to the negative power supply terminal of the corresponding transmission driver 152A and the other end thereof being connected to the first short-circuit signal line Wsu, and the plurality of fourth short-circuit control elements SWDD each having both ends short-circuited or opened according to the control signal CTDD, the one end thereof being connected to the negative power supply terminal of the corresponding transmission driver 152A and the other end thereof being connected to the second short-circuit signal line Wsd.

According to the configuration, the sensor controller 10 can output the intermediate potential from the intermediate potential supply unit 153B including the potential generation circuit 154B including the capacitive element Cext to the transmission drivers 152A, to thereby stably supply the intermediate potential to the transmission drivers 152A at necessary timings. Therefore, according to the present disclosure, the sensor controller 10 can reduce the power consumption more than in the conventional configuration, without connecting elements, such as switches, to the output signal lines Wout.

Furthermore, the control circuit 12 in the present embodiment determines, for each transmission driver 152A, to which one of the first short-circuit signal line Wsu and the second short-circuit signal line Wsd the output signal line Wout is to be connected, controls at least one of the corresponding first short-circuit control element SWUU and third short-circuit control element SWDU in such a manner as to short-circuit at the first timings (times t81, t83, t85, and t87) and open at the second timings (times t82, t84, t86, and t88) when the control circuit 12 determines to connect the output signal line Wout to the first short-circuit signal line Wsu, and controls at least one of the corresponding second short-circuit control element SWUD and fourth short-circuit control element SWDD in such a manner as to short-circuit at the first timings (times t81, t83, t85, and t87) and open at the second timings (times t82, t84, t86, and t88) when the control circuit 12 determines to connect the output signal line Wout to the second short-circuit signal line Wsd.

According to the configuration, the sensor controller 10 can switch the state of output of each transmission driver 152A to the high impedance state and provide a period for stably supplying the intermediate potential from the intermediate potential supply unit 153A to each output signal line Wout, to thereby reduce the power consumption.

Third Embodiment

This completes the description of the second embodiment. Next, a third embodiment will be described.
Circuit Configuration FIG. 9 is a diagram illustrating an example of a circuit configuration of an output circuit 15C including an intermediate potential supply unit 153C according to the third embodiment.

Figure 9:
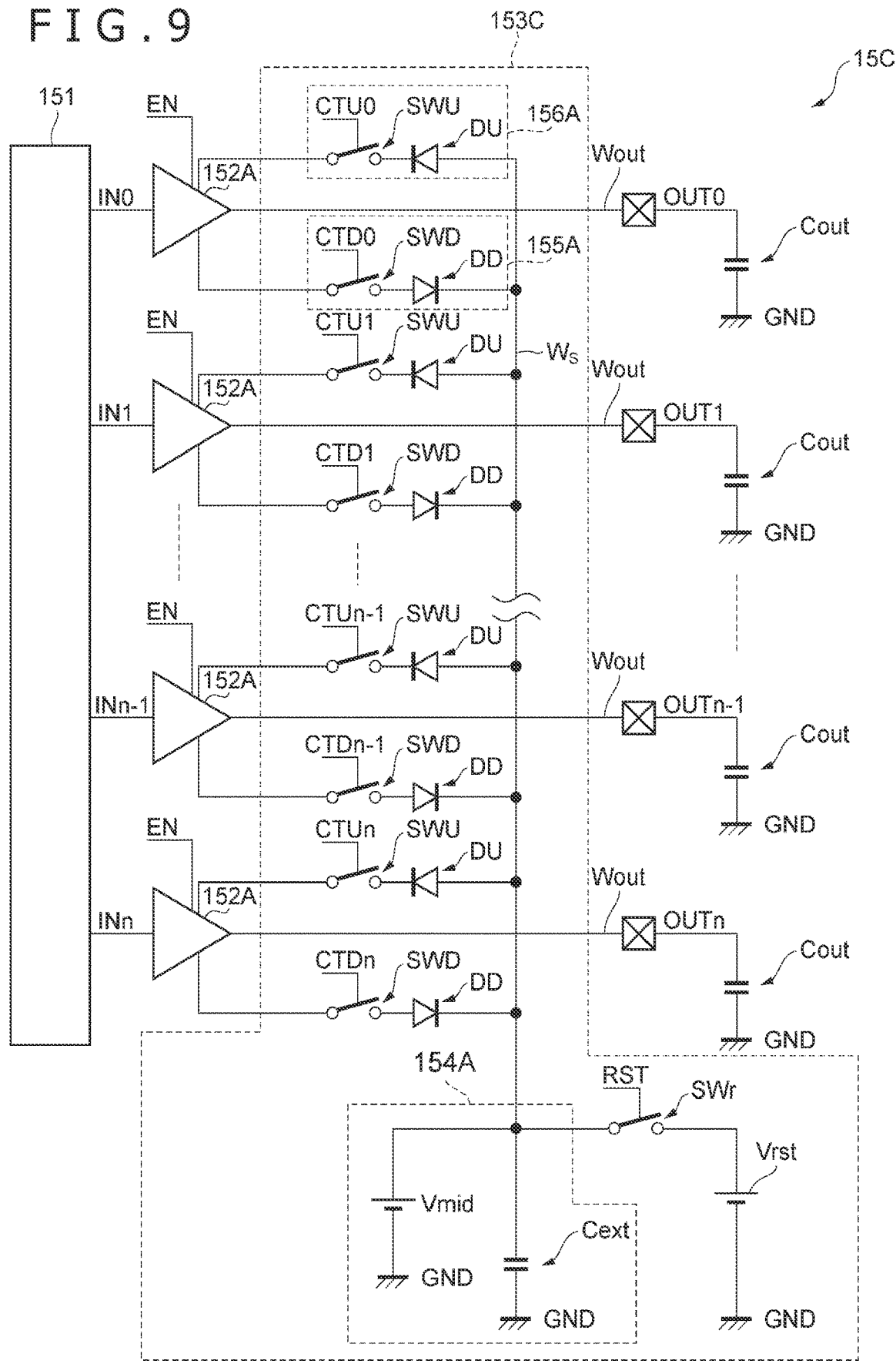
FIG. 9 is a diagram illustrating an example of a circuit configuration of an output circuit including an intermediate potential supply unit according to a third embodiment of the present disclosure.

As illustrated in FIG. 9, the output circuit 15C includes the driver selection circuit 151, the plurality of transmission drivers 152A, and the intermediate potential supply unit 153C. Note that, in FIG. 9, it is assumed that the driver selection circuit 151 selects n+1 transmission drivers 152A. In addition, it is assumed that the linear electrode 22 includes the capacitive element Cout as load capacitance. The capacitance of the capacitive element Cout is, for example, approximately 1200 pF. Note that the driver selection circuit 151 and the transmission driver 152A are similar to those of the first embodiment, and the description will not be repeated.

The intermediate potential supply unit 153C includes the potential generation circuit 154A, a plurality of output control circuits 155A and 156A, the short-circuit signal line Ws, the short-circuit control element SWr, and the reset voltage source Vrst. Note that the potential generation circuit 154A, the short-circuit control element SWr, and the reset voltage source Vrst are similar to those of the first embodiment, and the description will not be repeated.

One output control circuit 155A is provided for each transmission driver 152A, and the output control circuit 155A electrically connects or electrically disconnects a current path in a first direction from the corresponding output signal line Wout to the short-circuit signal line Ws according to the control signal CTD output from the control circuit 12 to each corresponding transmission driver 152A. The output control circuit 155A includes the short-circuit control element SWD and a current control element DD.

One output control circuit 156A is provided for each transmission driver 152A. The output control circuit 156A electrically connects or electrically disconnects a current path in a second direction from the short-circuit signal line Ws to the corresponding output signal line Wout according to the control signal CTU output from the control circuit 12 to each corresponding transmission driver 152A. The output control circuit 156A includes the short-circuit control element SWU and a current control element DU.

The short-circuit control elements SWU and SWD are, for example, switch elements or transistors, and the short-circuit control elements SWU and SWD short-circuit or open both ends according to the input signals. Specifically, the short-circuit control elements SWU and SWD short-circuit both ends when the state of the input signals are the high state, and open both ends when the state of the input signals is the low state.

The one end of the short-circuit control element SWD is connected to the negative power supply terminal of the corresponding transmission driver 152A, and the other end of the short-circuit control element SWD is connected to an anode terminal of the current control element DD. The short-circuit control element SWD short-circuits or opens both ends according to the control signal CTD.

The one end of the short-circuit control element SWU is connected to the positive power supply terminal of the corresponding transmission driver 152A, and the other end of the short-circuit control element SWU is connected to a cathode terminal of the current control element DU. The short-circuit control element SWU short-circuits or opens both ends according to the control signal CTU.

The current control element DD is, for example a diode. A current path of the current control element DD in the first direction from the short-circuit control element SWD to the short-circuit signal line Ws is electrically connected, and a current path of the current control element DD in a direction from the short-circuit signal line Ws to the short-circuit control element SWD is electrically disconnected. The anode terminal of the current control element DD is connected to the short-circuit control element SWD, and a cathode terminal of the current control element DD is connected to the short-circuit signal line Ws.

The current control element DU is, for example, a diode. An anode terminal of the current control element DU is connected to the short-circuit signal line Ws, and the cathode terminal of the current control element DU is connected to the short-circuit control element SWU. A current path of the current control element DU in the second direction from the short-circuit signal line Ws to the short-circuit control element SWU is electrically connected, and a current path of the current control element DU in a direction from the short-circuit control element SWU to the short-circuit signal line Ws is electrically disconnected.

In the output circuit 15C configured in this way, the control circuit 12 controls the short-circuit control element SWU to the short-circuit state at the timing at which the state of one of the input signals IN0 to INn transitions from the low state to the high state. In addition, the control circuit 12 controls the short-circuit control element SWD to the short-circuit state at the timing at which the state of one of the input signals IN0 to INn transitions from the high state to the low state. As a result, the current path in the first direction from the positive power supply terminal of the transmission driver 152A with potential in high level to the short-circuit signal line Ws is electrically connected, and the current path in the second direction from the short-circuit signal line Ws to the negative power supply terminal of the transmission driver 152A with potential in low level is electrically connected. Therefore, the charge is supplied from the output signal lines Wout with potential in high level to the capacitive element Cext and the output signal lines Wout with potential in low level through the transmission drivers 152A and the short-circuit signal line Ws. In addition, the charge is supplied from the voltage source Vmid and the capacitive element Cext to the output signal lines Wout with potential in low level through the short-circuit signal line Ws and the transmission drivers 152A. As a result, the potential of each output signal line Wout and the short-circuit signal line Ws reaches the intermediate potential.

Next, the current control element DU electrically disconnects the current path in the second direction at a timing at which the potential of the short-circuit signal line Ws falls below the potential of the corresponding output signal line Wout. In addition, the current control element DD electrically disconnects the current path in the first direction at a timing at which the potential of the corresponding output signal line Wout falls below the potential of the short-circuit signal line Ws. In this way, the corresponding transmission driver 152A shifts the potential of each output signal line Wout from the intermediate potential to the high level or the low level, and the transmission signals OUT0, OUT1, OUTn−1, and OUTn are transmitted through the linear electrodes 22.

Figure 11A:
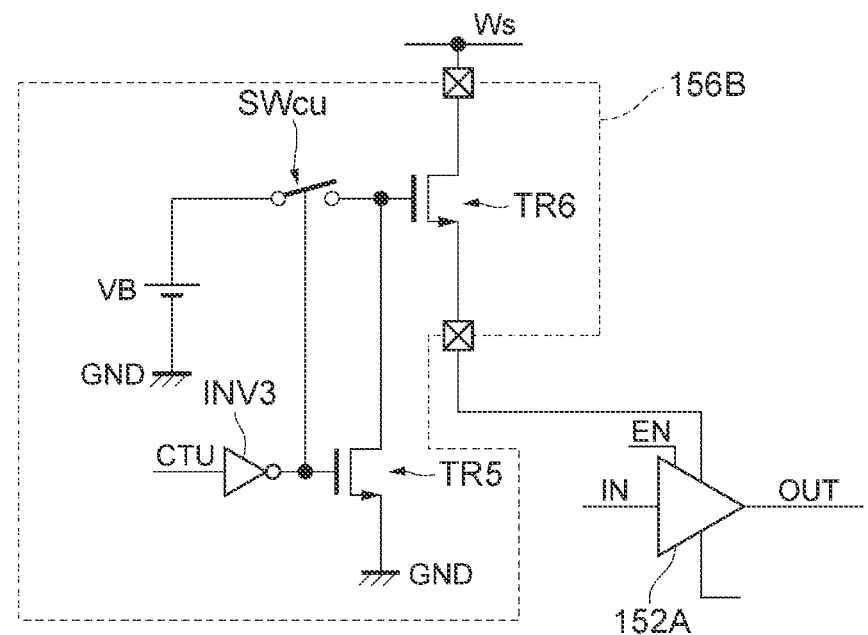
FIG. 11A is a diagram illustrating a first example of a circuit configuration of an output control circuit according to the third embodiment of the present disclosure.

This completes the description of the configuration of the output circuit 15C. Next, another example of the circuit configuration of the output control circuit 156 will be described. FIG. 11A is a diagram illustrating another example of the circuit configuration of the output control circuit 156 according to the third embodiment.

As illustrated in FIG. 11A, an output control circuit 156B includes a NOT circuit INV3, transistors TR5 and TR6, a short-circuit control element SWcu, and a voltage source VB.

The NOT circuit INV3 is, for example, an inverter circuit including a MOS transistor. The NOT circuit INV3 performs a NOT operation of the control signal CTU output from the control circuit 12 and outputs the result of the operation to the short-circuit control element SWcu and a gate terminal of the transistor TR5.

The transistors TR5 and TR6 are, for example, n-type MOS transistors, and the transistors TR5 and TR6 discharge the electricity from drain terminals toward source terminals or stops the discharge according to signals input to gate terminals. Specifically, the transistors TR5 and TR6 discharge the electricity from the drain terminals toward the source terminals when the state of the signals input to the gate terminals is the high state, and stops the discharge when the state of the signals input to the gate terminals is the low state.

The gate terminal of the transistor TR5 is connected to an output terminal of the NOT circuit INV3. The source terminal of the transistor TR5 is connected to the reference line GND. The drain terminal of the transistor TR5 is connected to the gate terminal of the transistor TR6 and another end of the short-circuit control element SWcu. The transistor TR5 discharges the electricity from the gate terminal of the transistor TR6 toward the reference line GND according to a signal output from the NOT circuit INV3.

The gate terminal of the transistor TR6 is connected to the drain terminal of the transistor TR5 and the other end of the short-circuit control element SWcu. The source terminal of the transistor TR6 is connected to the positive power supply terminal of the corresponding transmission driver 152A. The drain terminal of the transistor TR6 is connected to the short-circuit signal line Ws. The transistor TR6 supplies the potential of the short-circuit signal line Ws to the corresponding output signal line Wout according to the potential of the gate terminal. Note that the transistor TR6 stops the supply of the potential from the short-circuit signal line Ws to the corresponding output signal line Wout when the potential of the short-circuit signal line Ws and the potential of the positive power supply terminal of the corresponding transmission driver 152A are the same.

The voltage source VB generates the intermediate potential and supplies the generated intermediate potential to one end of the short-circuit control element SWcu. One end of the voltage source VB is connected to the short-circuit control element SWcu, and another end of the voltage source VB is connected to the reference line GND.

The short-circuit control element SWcu is, for example, a transistor or a switch element. The one end of the short-circuit control element SWcu is connected to the voltage source VB, and the other end of the short-circuit control element SWcu is connected to the drain terminal of the transistor TR5 and the gate terminal of the transistor TR6. The short-circuit control element SWcu short-circuits or opens both ends according to the signal output from the NOT circuit INV3. Specifically, the short-circuit control element SWcu short-circuits both ends when the state of the signal output from the NOT circuit INV3 is the low state, and opens both ends when the signal is in the high state.

The output control circuit 156B configured in this way supplies the potential of the short-circuit signal line Ws to the corresponding output signal line Wout according to the control signal CTU output from the control circuit 12. Specifically, the output control circuit 156B supplies the potential of the short-circuit signal line Ws to the positive power supply terminal of the corresponding transmission driver 152A when the state of the control signal CTU is the high state, and stops the supply of the potential from the short-circuit signal line Ws to the positive power supply terminal of the corresponding transmission driver 152A when the state of the control signal CTU is the low state. In addition, the output control circuit 156B also stops the supply of the potential from the short-circuit signal line Ws to the positive power supply terminal of the corresponding transmission driver 152A when the potential of the short-circuit signal line Ws and the potential of the positive power supply terminal of the corresponding transmission driver 152A are the same.

Figure 11B:
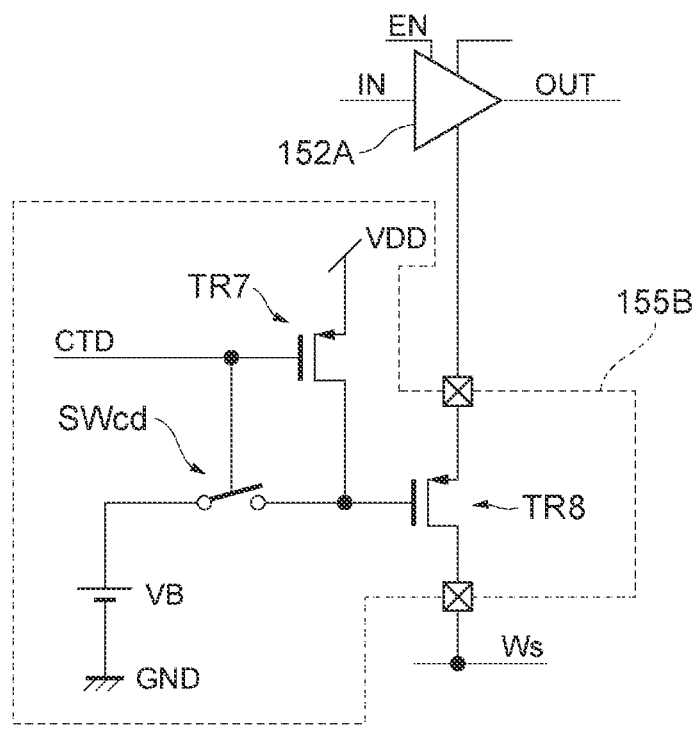
FIG. 11B is a diagram illustrating a second example of the circuit configuration of the output control circuit according to the third embodiment of the present disclosure.

This completes the description of the circuit configuration of the output control circuit 156B. Next, another example of the circuit configuration of the output control circuit 155 will be described. FIG. 11B is a diagram illustrating another example of the circuit configuration of the output control circuit 155 according to the third embodiment.

As illustrated in FIG. 11B, an output control circuit 155B includes transistors TR7 and TR8, a short-circuit control element SWed, and the voltage source VB.

The transistors TR7 and TR8 are, for example, p-type MOS transistors. The transistors TR7 and TR8 supply, to drain terminals, the potential supplied to source terminals or stops the supply according to signals input to gate terminals. Specifically, the transistors TR7 and TR8 supply, to the drain terminals, the potential supplied to the source terminals when the state of the signals input to the gate terminals is the low state, and stop the supply when the state of the signals input to the gate terminals is the high state.

The gate terminal of the transistor TR7 is connected to the control circuit 12. The source terminal of the transistor TR7 is connected to the power supply line VDD. The drain terminal of the transistor TR7 is connected to the gate terminal of the transistor TR8 and another end of the short-circuit control element SWcd. The transistor TR7 supplies the potential (high level) of the power supply line VDD to the gate terminal of the transistor TR8 according to the control signal CTD output from the control circuit 12.

The gate terminal of the transistor TR8 is connected to the drain terminal of the transistor TR7 and the other end of the short-circuit control element SWed. The source terminal of the transistor TR8 is connected to the negative power supply terminal of the corresponding transmission driver 152A. The drain terminal of the transistor TR8 is connected to the short-circuit signal line Ws. The transistor TR8 supplies the potential of the negative power supply terminal of the corresponding transmission driver 152A to the short-circuit signal line Ws according to the potential of the gate terminal. Note that the supply of the potential from the negative power supply terminal of the corresponding transmission driver 152A to the short-circuit signal line Ws is stopped when the potential of the short-circuit signal line Ws and the potential of the negative power supply terminal of the corresponding transmission driver 152A are the same.

The voltage source VB generates the intermediate potential and supplies the generated intermediate potential to one end of the short-circuit control element SWed. The one end of the voltage source VB is connected to the short-circuit control element SWed, and the other end of the voltage source VB is connected to the reference line GND.

The short-circuit control element SWcd is, for example, a transistor or a switch element. The one end of the short-circuit control element SWed is connected to the voltage source VB, and the other end of the short-circuit control element SWed is connected to the drain terminal of the transistor TR7 and the gate terminal of the transistor TR8. The short-circuit control element SWcd short-circuits or opens both ends according to the control signal CTD output from the control circuit 12. Specifically, the short-circuit control element SWed short-circuits both ends when the state of the control signal CTD is the high state, and opens both ends when the signal is in the low state.

The output control circuit 155B configured in this way supplies the potential of the negative power supply terminal of the corresponding transmission driver 152A to the short-circuit signal line Ws according to the control signal CTD output from the control circuit 12. Specifically, the output control circuit 155B supplies the potential of the negative power supply terminal of the corresponding transmission driver 152A to the short-circuit signal line Ws when the state of the control signal CTD is the high state, and stops the supply of the potential from the negative power supply terminal of the corresponding transmission driver 152A to the short-circuit signal line Ws when the state of the control signal CTD is the low state. In addition, the output control circuit 155B also stops the supply of the potential from the negative power supply terminal of the corresponding transmission driver 152A to the short-circuit signal line Ws when the potential of the short-circuit signal line Ws and the potential of the negative power supply terminal of the corresponding transmission driver 152A are the same.

Figure 14:
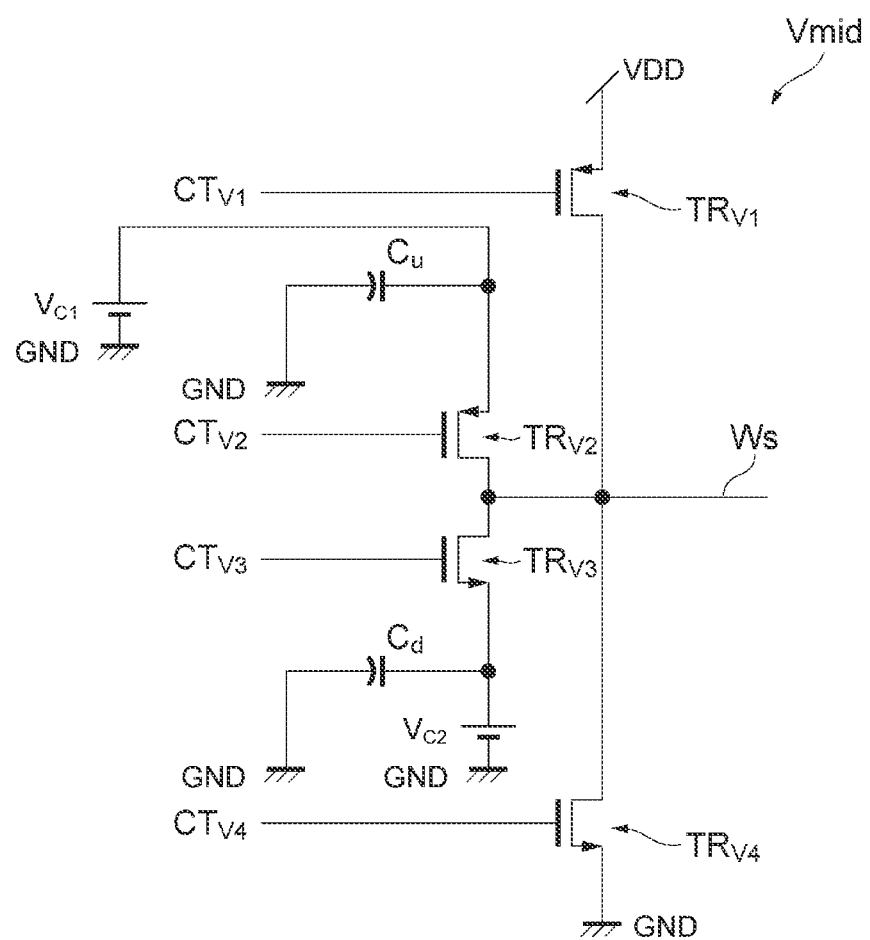
FIG. 14 is a diagram illustrating an example of a circuit configuration of a voltage source in a potential generation circuit.

This completes the description of the circuit configuration of the output control circuit 155B. Next, an example of a configuration of a circuit of the voltage source Vmid will be described. FIG. 14 is a diagram illustrating an example of the circuit configuration of the voltage source Vmid according to the third embodiment.

As illustrated in FIG. 14, the voltage source Vmid includes transistors TRv1, TRv2, TRv3, and TRv4, capacitive elements Cu and Cd, voltage sources Vc1 and Vc2, the power supply line VDD, and the reference line GND.

The transistors TRv1 and TRV2 are, for example, p-type MOS transistors. The transistors TRv1 and TRv2 supply, to drain terminals, the potential supplied to source terminals or stop the supply according to signals input to gate terminals. Specifically, the transistors TRv1 and TRv2 supply, to the drain terminals, the potential supplied to the source terminals when the state of the signals input to the gate terminals is the low state, and stops the supply when the state of the signals input to the gate terminals is the high state.

The transistor TRv1 supplies, to the short-circuit signal line Ws connected to the drain terminal, the potential of the power supply line VDD connected to the source terminal according to a control signal CTv1 input from the control circuit 12 to the gate terminal.

The transistor TRv2 supplies, to the short-circuit signal line Ws connected to the drain terminal, the potential of the voltage source Vc1 connected to the source terminal according to a control signal CTv2 input from the control circuit 12 to the gate terminal.

The transistors TRv3 and TRv4 are, for example, n-type MOS transistors. The transistors TRv3 and TRv4 discharge the electricity from drain terminals toward source terminals or stop the discharge according to signals input to gate terminals. Specifically, the transistors TRv3 and TRv4 discharge the electricity from the drain terminals toward the source terminals when the state of the signals input to the gate terminals is the high state, and stop the discharge when the state of the signals input to the gate terminals is the low state.

The transistor TRv3 supplies, to the short-circuit signal line Ws connected to the drain terminal, the potential of the voltage source Vc2 connected to the source terminal according to a control signal CTv3 input from the control circuit 12 to the gate terminal.

The transistor TRv4 supplies, to the short-circuit signal line Ws connected to the drain terminal, the potential of the reference line GND connected to the source terminal according to a control signal CTv4 input from the control circuit 12 to the gate terminal.

The voltage source Vc1 supplies the potential to the source terminal of the transistor TRv2 and the capacitive element Cu. The potential supplied by the voltage source Vc1 is, for example, two-thirds of the potential in high level. One end of the voltage source Vc1 is connected to the source terminal of the transistor TRv2 and an anode of the capacitive element Cu, and another end of the voltage source Vc1 is connected to the reference line GND.

The voltage source Vc2 supplies the potential to the source terminal of the transistor TRv3 and the capacitive element Cd. The potential supplied by the voltage source Vc2 is, for example, one third of the potential in high level. The one end of the voltage source Vc2 is connected to the source terminal of the transistor TRv3 and an anode of the capacitive element Cd, and the other end of the voltage source Vc1 is connected to the reference line GND.

The capacitive element Cu is, for example, an electrolytic capacitor, and the capacitive element Cu stabilizes the potential of the voltage source Vc1. The anode of the capacitive element Cu is connected to the source terminal of the transistor TRv2 and the voltage source Vc1, and a cathode of the capacitive element Cu is connected to the reference line GND.

The capacitive element Cd is, for example, an electrolytic capacitor, and the capacitive element Cd stabilizes the potential of the voltage source Vc2. The anode of the capacitive element Cd is connected to the source terminal of the transistor TRv3 and the voltage source Vc2, and a cathode of the capacitive element Cd is connected to the reference line GND.

The voltage source Vmid configured in this way switches the potential between four kinds of potential including the potential in high level, two thirds of the potential in high level, one third of the potential in high level, and the potential in low level and supplies the potential to the short-circuit signal line Ws according to the control signals CTv1, CTv2, CTv3, and CTv4 output from the control circuit 12. Note that the potential supplied by the voltage sources Vc1 and Vc2 is not limited to the potential described above, and the potential may be, for example, one half of the potential in high level.

Flow of Series of Operations Related to Output Circuit

Figure 10:
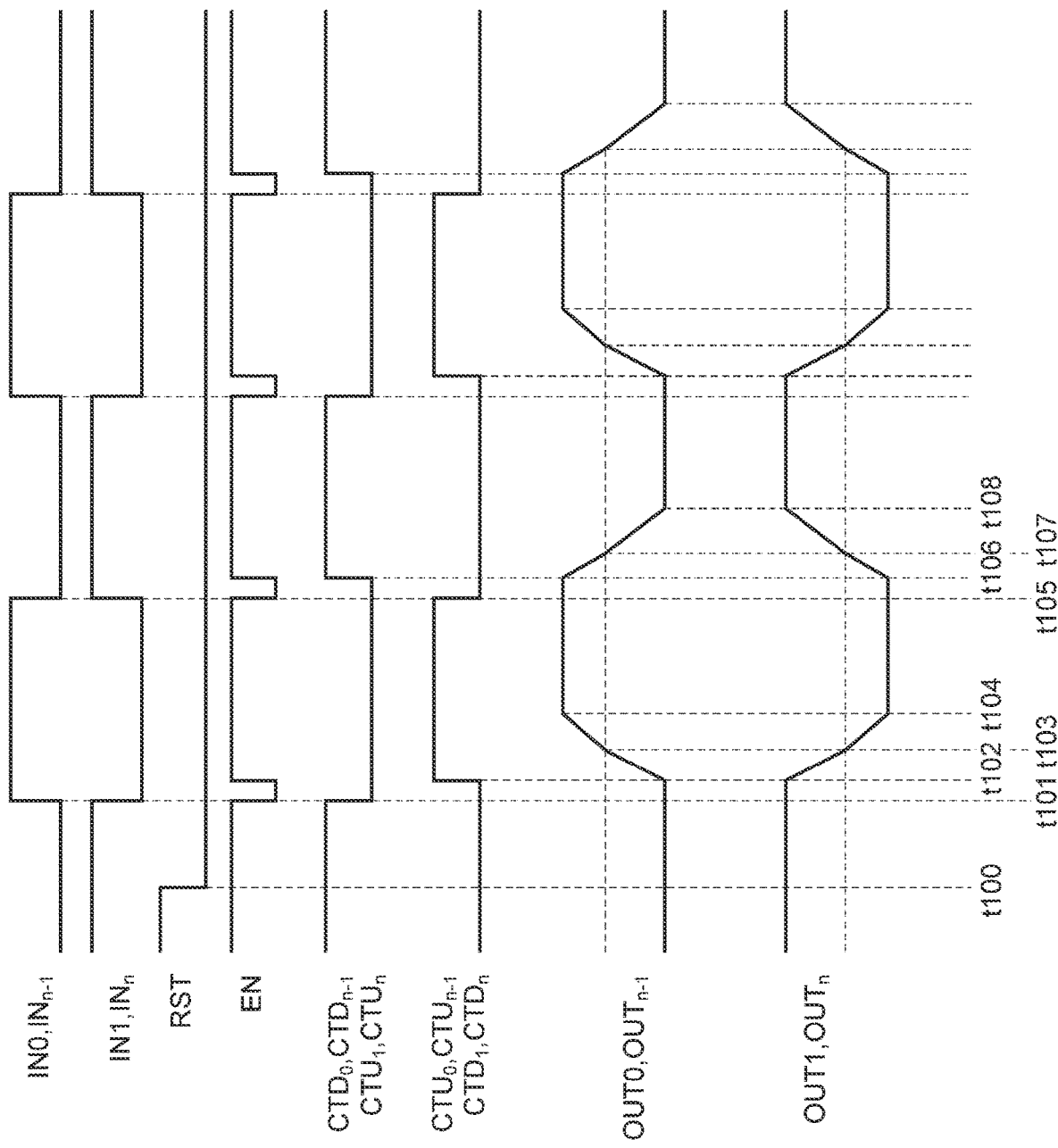
FIG. 10 is a timing chart illustrating an example of transition of potential of each signal in the output circuit according to the third embodiment of the present disclosure.

This completes the description of the example of the circuit configuration of the voltage source Vmid. Next, the transition of the potential of each signal in the output circuit 15C will be described in detail. FIG. 10 is a timing chart illustrating the transition of the potential of each signal in the output circuit 15C according to the third embodiment.

At a time t100, the control circuit 12 switches the state of the reset signal RST to the low state to open both ends of the short-circuit control element SWr. This stops the supply of the initial potential from the reset voltage source Vrst to the short-circuit signal line Ws.

At a time t101, the driver selection circuit 151 shifts the state of the input signals IN0 and INn−1 from the low state to the high state and shifts the state of the input signals IN1 and INn from the high state to the low state. The driver selection circuit 151 then inputs the input signals IN0, IN1, INn−1, and INn to the corresponding transmission drivers 152A. In addition, the control circuit 12 switches the state of the transmission drivers 152A to the high impedance state at the time t101.

At the time t101, the control circuit 12 shifts the state of the control signals CTD0, CTDn−1, CTU1, and CTUn from the high state to the low state and outputs the control signals CTD0, CTDn−1, CTU1, and CTUn to short-circuit control elements SWD0, SWDn−1, SWU1, and SWUn to thereby open both ends of the short-circuit control elements SWD0, SWDn−1, SWU1, and SWUn.

At a time t102 after a predetermined time period from the time t101, the control circuit 12 shifts the state of the control signals CTU0, CTUn−1, CTD1, and CTDn from the low state to the high state and outputs the control signals CTU0, CTUn−1, CTD1, and CTDn to the short-circuit control elements SWU0, SWUn−1, SWD1, and SWDn to thereby short-circuit both ends of the short-circuit control elements SWU0, SWUn−1, SWD1, and SWDn. In addition, the control circuit 12 switches the state of the transmission drivers 152A to the output state at the time t102.

As a result, at the time t102, the charge is supplied from the transmission drivers 152A corresponding to the transmission signals OTU1 and OUTn to the capacitive element Cext and the transmission drivers 152A corresponding to the transmission signals OUT0 and OUTn−1 through the short-circuit signal line Ws, and the potential of the transmission signals OUT0, OUT1, OUTn−1, and OUTn starts to transition to the intermediate potential.

At a time t103, the potential of the transmission signals OUT0, OUT1, OUTn−1, and OUTn reaches the intermediate potential. At the time t103, the current control element DU electrically disconnects the current path in the second direction. In addition, at the time t103, the current control element DD electrically disconnects the current path in the first direction. In addition, at the time t103, the transmission drivers 152A corresponding to the transmission signals OUT0 and OUTn−1 supply the charge to the corresponding output signal lines Wout. As a result, at the time t103, the potential of the transmission signals OUT0 and OUTn−1 starts to transition from the intermediate potential to the high level. In addition, at the time t103, the transmission drivers 152A corresponding to the transmission signals OUT1 and OUTn discharge the electricity from the corresponding output signal lines Wout. As a result, the potential of the transmission signals OUT1 and OUTn starts to transition from the intermediate potential to the low level at the time t103.

At a time t104, the charge is supplied from the corresponding transmission drivers 152A, so that the potential of the transmission signals OUT0 and OUTn−1 reaches the high level. In addition, at the time t104, the electricity is discharged from the corresponding transmission drivers 152A, so that the potential of the transmission signals OUT1 and OUTn reaches the low level.

At a time t105, the control circuit 12 shifts the state of the control signals CTU0, CTUn−1, CTD1, and CTDn from the high state to the low state and outputs the control signals CTU0, CTUn−1, CTD1, and CTDn to the short-circuit control elements SWU0, SWUn−1, SWD1, and SWDn to thereby open both ends of the short-circuit control elements SWU0, SWUn−1, SWD1, and SWDn. In addition, the control circuit 12 switches the state of the transmission drivers 152A to the high impedance state at the time t105.

At a time t106 after a predetermined time period from the time t105, the control circuit 12 shifts the state of the control signals CTD0, CTDn−1, CTU1, and CTUn from the low state to the high state and outputs the control signals CTD0, CTDn−1, CTU1, and CTUn to the short-circuit control elements SWD0, SWDn−1, SWU1, and SWUn to thereby short-circuit both ends of the short-circuit control elements SWD0, SWDn−1, SWU1, and SWUn. In addition, the control circuit 12 switches the state of the transmission drivers 152A to the output state at the time t106.

As a result, at the time t106, the charge is supplied from the transmission drivers 152A corresponding to the transmission signals OUT0 and OUTn−1 to the capacitive element Cext and the transmission drivers 152A corresponding to the transmission signals OUT1 and OUTn through the short-circuit signal line Ws, and the potential of the transmission signals OUT0, OUT1, OUTn−1, and OUTn starts to transition to the intermediate potential.

At a time t107, the potential of the transmission signals OUT0, OUT1, OUTn−1, and OUTn reaches the intermediate potential. At the time t107, the current control element DU electrically disconnects the current path in the second direction. In addition, at the time t107, the current control element DD electrically disconnects the current path in the first direction. In addition, at the time t107, the transmission drivers 152A corresponding to the transmission signals OUT1 and OUTn supply the charge to the corresponding output signal lines Wout. As a result, at the time t107, the potential of the transmission signals OUT1 and OUTn starts to transition from the intermediate potential to the high level. In addition, at the time t107, the transmission drivers 152A corresponding to the transmission signals OUT0 and OUTn−1 discharge the electricity from the corresponding output signal lines Wout. As a result, the potential of the transmission signals OUT0 and OUTn−1 starts to transition from the intermediate potential to the low level at the time t107.

At a time t108, the charge is supplied from the corresponding transmission drivers 152A, so that the potential of the transmission signals OUT1 and OUTn reaches the high level. In addition, at the time t108, the electricity is discharged from the corresponding transmission drivers 152A, so that the potential of the transmission signals OUT0 and OUTn−1 reaches the low level.

This completes the description of the transition of the potential of each signal in the output circuit 15C. Next, a flow of a series of processes in the output circuit 15C will be described in detail. FIG. 16 is a flow chart illustrating the flow of the series of processes in the output circuit 15C according to the third embodiment.

SP60

The transmission driver 152A amplifies the input signal IN input from the driver selection circuit 151 to a signal with a potential difference that allows transmission of the signal from the linear electrode 22. The transmission driver 152A sets the amplified signal as the transmission signal OUT and transmits the transmission signal OUT to the corresponding output signal line Wout. The process then moves to a process of SP62.

SP62

The control circuit 12 determines whether or not the signal waveform of the transmission signal OUT rises from the low level to the high level at this timing. If the determination is affirmative, the process moves to a process of SP64. On the other hand, if the determination is negative, the process moves to a process of SP68.

SP64

The control circuit 12 controls both ends of each short-circuit control element SWD to open. The process then moves to a process of SP66.

SP66

The control circuit 12 controls both ends of each short-circuit control element SWU to short-circuit. As a result, the potential is supplied from the transmission drivers 152A corresponding to the output signal lines Wout with potential in high level to the capacitive element Cext and the transmission drivers 152A corresponding to the output signal lines Wout with potential in low level through the short-circuit signal line Ws. The potential of the output signal line Wout corresponding to each transmission driver 152A and the short-circuit signal line Ws first transitions to the intermediate potential. The potential of the output signal line Wout corresponding to each transmission driver 152A then transitions from the intermediate potential to the high level.

SP68

The control circuit 12 determines whether or not the signal waveform of the transmission signal OUT falls from the high level to the low level at this timing. If the determination is affirmative, the process moves to a process of SP70. On the other hand, if the determination is negative, the series of processes illustrated in FIG. 16 ends.

SP70

The control circuit 12 controls both ends of each short-circuit control element SWU to open. The process then moves to a process of SP72.

SP72

The control circuit 12 controls both ends of each short-circuit control element SWD to short-circuit. As a result, the potential is supplied from the transmission drivers 152A corresponding to the output signal lines Wout with potential in high level to the capacitive element Cext and the transmission drivers 152A corresponding to the output signal lines Wout with potential in low level through the short-circuit signal line Ws. The potential of the output signal line Wout corresponding to each transmission driver 152A and the short-circuit signal line Ws first transitions to the intermediate potential. The potential of the output signal line Wout corresponding to each transmission driver 152A then transitions from the intermediate potential to the low level.

Effects

As described above, the sensor controller 10 in the present embodiment includes the control circuit 12 that transmits the control signals CTU and CTD, and the intermediate potential supply unit 153C includes the short-circuit signal line Ws, the plurality of first output control circuits 155A each having the one end thereof connected to the negative power supply terminal of the corresponding transmission driver 152A and the other end thereof connected to the short-circuit signal line Ws, each of the plurality of first output control circuits 155A being electrically connected only in the first direction from the negative power supply terminal to the short-circuit signal line Ws according to the control signal CTD, and the plurality of second output control circuits 156A each having the one end thereof connected to the positive power supply terminal of the corresponding transmission driver 152A and the other end thereof connected to the short-circuit signal line Ws, each of the plurality of second output control circuits 156A being electrically connected only in the second direction from the corresponding short-circuit signal line Ws to the positive power supply terminal according to the control signal CTU.

According to the configuration, the output control circuit 155A electrically disconnects the current path in the first direction at the timing at which the potential of the short-circuit signal line Ws exceeds the potential of the negative power supply terminal of the corresponding transmission driver 152A. In addition, the output control circuit 156A electrically disconnects the current path in the second direction at the timing at which the potential of the positive power supply terminal of the corresponding transmission driver 152A exceeds the potential of the short-circuit signal line Ws. Therefore, according to the present disclosure, the sensor controller 10 supplies the intermediate potential from the intermediate potential supply unit 153C to the transmission driver 152A only in the necessary period. Therefore, the sensor controller 10 can reduce the power consumption more than in the conventional configuration, without connecting elements, such as switches, to the output signal lines Wout.

Further, the first output control circuit 155B in the present embodiment includes the n-type transistor in which the source terminal is connected to the negative power supply terminal, the drain terminal is connected to the short-circuit signal line Ws, and the first potential (low level) is supplied to the gate terminal or the intermediate potential is supplied from the voltage source VB different from the transmission driver 152A and the intermediate potential supply unit 153C to the gate terminal. In addition, the second output control circuit 156B includes the p-type transistor in which the source terminal is connected to the positive power supply terminal, the drain terminal is connected to the short-circuit signal line Ws, and the second potential (high level) is supplied to the gate terminal or the intermediate potential is supplied from the voltage source VB different from the transmission driver 152A and the intermediate potential supply unit 153C to the gate terminal.

According to the configuration, the output control circuits 155A and 156A include the transistors in place of the current control elements DU and DD, and the cost of parts can be reduced.

Further, the control circuit 12 in the present embodiment controls each of the first output control circuits 155A in such a manner as to be electrically connected only in the second direction at the timing at which the potential of the signal waveform of the corresponding transmission driver 152A falls, and to be electrically disconnected at the timing at which the potential of the signal waveform of the corresponding transmission driver 152A rises. In addition, the control circuit 12 controls each of the second output control circuits 156A in such a manner as to be electrically connected only in the first direction at the timing at which the potential of the signal waveform of the corresponding transmission driver 152A rises, and to be electrically disconnected at the timing at which the potential of the signal waveform of the corresponding transmission driver 152A falls.

According to the configuration, the sensor controller 10 supplies the intermediate potential from the intermediate potential supply unit 153C to the transmission driver 152A only in the necessary period. Therefore, the sensor controller 10 can reduce the power consumption more than in the conventional configuration, without connecting elements, such as switches, to the output signal lines Wout.

Furthermore, the intermediate potential supply unit 153C in the present embodiment includes the potential generation circuit 154B including the voltage source Vmid or the capacitive element Cext separate from the transmission driver 152A, and the intermediate potential supply unit 153C outputs the voltage from the potential generation circuit 154B in the period from the timing of the start of the transition from the first potential (low level) to the second potential (high level) or the transition from the second potential (high level) to the first potential (low level) to the timing that the potential of the positive power supply terminal or the negative power supply terminal of the transmission driver 152A reaches the intermediate potential, to thereby supply the intermediate potential to the transmission driver 152A.

According to the configuration, the sensor controller 10 supplies the intermediate potential from the intermediate potential supply unit 153C to the transmission driver 152A only in the necessary period. Therefore, the sensor controller 10 can reduce the power consumption more than in the conventional configuration, without connecting elements, such as switches, to the output signal lines Wout.

Fourth Embodiment

This completes the description of the third embodiment. Next, a fourth embodiment will be described.
Circuit Configuration FIG. 12 is a diagram illustrating an example of a circuit configuration of an output circuit 15D including an intermediate potential supply unit 153D according to the fourth embodiment.

Figure 12:
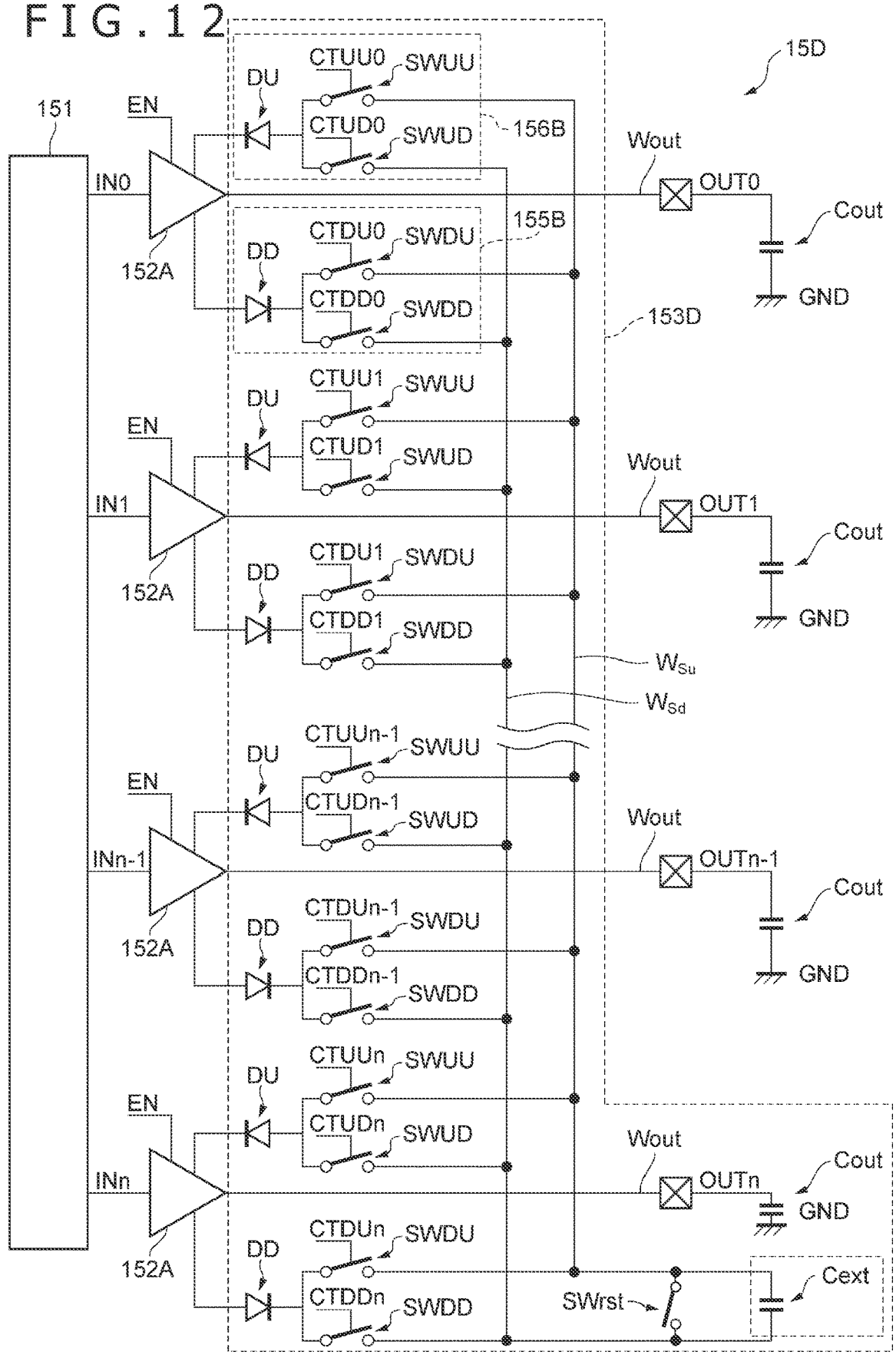
FIG. 12 is a diagram illustrating an example of a circuit configuration of an output circuit including an intermediate potential supply unit according to a fourth embodiment of the present disclosure.

As illustrated in FIG. 12, the output circuit 15D includes the driver selection circuit 151, the plurality of transmission drivers 152A, and the intermediate potential supply unit 153D. Note that, in FIG. 12, it is assumed that the driver selection circuit 151 selects n+1 transmission drivers 152A. In addition, it is assumed that the linear electrode 22 includes the capacitive element Cout as load capacitance. The capacitance of the capacitive element Cout is, for example, approximately 1200 pF. Note that the driver selection circuit 151 and the transmission drivers 152A are similar to those of the first embodiment, and the description will not be repeated.

The intermediate potential supply unit 153D includes the potential generation circuit 154B, a plurality of output control circuits 155BD and 156C, the short-circuit signal lines Wsu and Wsd, and the short-circuit control element SWr. Note that the potential generation circuit 154B and the short-circuit control element SWr are similar to those described above, and the description will not be repeated.

The output control circuit 155B includes, for example, short-circuit control elements SWDU0 and SWDD0 and the current control element DD. One output control circuit 155B is provided for each corresponding transmission driver 152A, and the output control circuit 155B supplies the potential of the negative power supply terminal of the corresponding transmission driver 152B to the short-circuit signal lines Wsu and Wsd according to the control signals CTDD and CTDU output from the control circuit 12 to each corresponding transmission driver 152A. Specifically, the output control circuit 155B supplies the potential of the negative power supply terminal of the corresponding transmission driver 152A to the short-circuit signal line Wsu when the state of the control signal CTDU is the high state, and stops the supply of the potential from the negative power supply terminal of the corresponding transmission driver 152A to the short-circuit signal line Wsu when the state of the control signal CTDU is the low state. In addition, the output control circuit 155B supplies the potential of the negative power supply terminal of the corresponding transmission driver 152A to the short-circuit signal line Wsd when the state of the control signal CTDD is the high state, and stops the supply of the potential from the negative power supply terminal of the corresponding transmission driver 152A to the short-circuit signal line Wsd when the state of the control signal CTDD is the low state.

The output control circuit 156B includes, for example, the short-circuit control elements SWUU and SWUD and the current control element DU. One output control circuit 156B is provided for each corresponding transmission driver 152A, and the output control circuit 156B supplies the potential of the short-circuit signal lines Wsu and Wsd to the positive power supply terminal of the corresponding transmission driver 152A according to the control signals CTUU and CTUD output from the control circuit 12 to each corresponding transmission driver 152A. Specifically, the output control circuit 156B supplies the potential of the short-circuit signal line Wsu to the positive power supply terminal of the corresponding transmission driver 152A when the state of the control signal CTUU is the high state, and stops the supply of the potential from the short-circuit signal line Wsu to the positive power supply terminal of the corresponding transmission driver 152A when the state of the control signal CTUU is the low state. In addition, the output control circuit 156B supplies the potential of the short-circuit signal line Wsd to the positive power supply terminal of the corresponding transmission driver 152A when the state of the control signal CTUD is the high state, and stops the supply of the potential from the short-circuit signal line Wsd to the positive power supply terminal of the corresponding transmission driver 152A when the state of the control signal CTUD is the low state.

The short-circuit control elements SWDU, SWDD, SWUU, and SWUD are, for example, transistors or switch elements, and the short-circuit control elements SWDU, SWDD, SWUU, and SWUD short-circuit or open both ends according to input signals. Specifically, the short-circuit control elements SWDU, SWDD, SWUU, and SWUD short-circuit both ends when the state of the input signals is the high state, and open both ends when the state of the input signals is the low state.

The one end of the short-circuit control element SWDU is connected to the short-circuit signal line Wsu, and the other end of the short-circuit control element SWDU is connected to the cathode terminal of the current control element DD. The short-circuit control element SWDU short-circuits or opens both ends according to the control signal CTDU output from the control circuit 12 to each corresponding transmission driver 152A.

The one end of the short-circuit control element SWDD is connected to the short-circuit signal line Wsd, and the other end of the short-circuit control element SWDD is connected to the cathode terminal of the current control element DD. The short-circuit control element SWDD short-circuits or opens both ends according to the control signal CTDD output from the control circuit 12 to each corresponding transmission driver 152A.

The one end of the short-circuit control element SWUU is connected to the short-circuit signal line Wsu, and the other end of the short-circuit control element SWUU is connected to the anode terminal of the current control element DU. The short-circuit control element SWUU short-circuits or opens both ends according to the control signal CTUU output from the control circuit 12 to each corresponding transmission driver 152A.

The one end of the short-circuit control element SWUD is connected to the short-circuit signal line Wsd, and the other end of the short-circuit control element SWUD is connected to the anode terminal of the current control element DU. The short-circuit control element SWUD short-circuits or opens both ends according to the control signal CTUD output from the control circuit 12 to each corresponding transmission driver 152A.

The current control element DD is, for example, a diode. The anode terminal of the current control element DD is connected to the negative power supply terminal of the corresponding transmission driver 152A, and the cathode terminal of the current control element DD is connected to the other end of the short-circuit control element SWDU and the other end of SWDD. The current control element DD electrically connects a current path in the direction from the negative power supply terminal of the corresponding transmission driver 152A to the short-circuit control elements SWDU and SWDD and electrically disconnects a current path in the direction from the short-circuit control elements SWDU and SWDD to the negative power supply terminal of the corresponding transmission driver 152A.

The current control element DU is, for example, a diode. The anode terminal of the current control element DU is connected to the short-circuit control elements SWUU and SWUD, and the cathode terminal of the current control element DU is connected to the positive power supply terminal of the corresponding transmission driver 152A. The current control element DU electrically connects a current path in the direction from the short-circuit control elements SWUU and SWUD to the positive power supply terminal of the corresponding transmission driver 152A and electrically disconnects a current path in the direction from the positive power supply terminal of the corresponding transmission driver 152A to the short-circuit control elements SWUU and SWUD.

In the output circuit 15D configured in this way, the control circuit 12 allocates a value corresponding to a code (for example, orthogonal code) to each transmission driver 152A and determines to which one of the short-circuit signal lines Wsu and Wsd the corresponding transmission driver 152A is to be connected. Specifically, the control circuit 12 determines to connect a transmission driver 152A to the short-circuit signal line Wsu when the value of the orthogonal code corresponding to the transmission driver 152A is "0," and determines to connect a transmission driver 152A to the short-circuit signal line Wsd when the value of the orthogonal code corresponding to the transmission driver 152A is "1," for example. Note that it is desirable that the number of values "0" and the number of values "1" included in the codes for determining the values allocated to the transmission drivers 152A be approximately the same.

The control circuit 12 controls, to the short-circuit state, the short-circuit control element SWDU corresponding to the transmission driver 152A determined to be connected to the short-circuit signal line Wsu and controls, to the short-circuit state, the short-circuit control element SWDD corresponding to the transmission driver 152A determined to be connected to the short-circuit signal line Wsd, at the timing at which the state of one of the input signals IN0 to INn transitions from the high state to the low state. Therefore, each of the direction from the transmission driver 152A determined to be connected to the short-circuit signal line Wsu to the short-circuit signal line Wsu and the direction from the transmission driver 152A determined to be connected to the short-circuit signal line Wsd to the short-circuit signal line Wsd is electrically connected. As a result, the charge is supplied from the corresponding transmission driver 152A to the one end of the capacitive element Cext through the short-circuit signal line Wsu, and the charge is supplied from the corresponding transmission driver 152A to the other end of the capacitive element Cext through the short-circuit signal line Wsd. The potential of the output signal lines Wout, the potential of the short-circuit signal lines Wsu and Wsd, and the potential of both ends of the capacitive element Cext reach the intermediate potential.

Next, the control circuit 12 controls the short-circuit control elements SWDU and SWDD to the open state at the timing at which the potential of each output signal line Wout, the short-circuit signal lines Wsu and Wsd, and both ends of the capacitive element Cext reaches the intermediate potential. As a result, the corresponding transmission driver 152A shifts the potential of the output signal line Wout corresponding to each transmission driver 152A to the low level, and the transmission signals OUT0, OUT1, OUTn−1, and OUTn are transmitted through the linear electrodes 22.

On the other hand, the control circuit 12 controls, to the short-circuit state, the short-circuit control element SWUU corresponding to the transmission driver 152A determined to be connected to the short-circuit signal line Wsu and controls, to the short-circuit state, the short-circuit control element SWDU corresponding to the transmission driver 152A determined to be connected to the short-circuit signal line Wsd, at the timing at which the state of one of the input signals IN0 to INn transitions from the low state to the high state. Therefore, each of the direction from the short-circuit signal line Wsu to the transmission driver 152A determined to be connected to the short-circuit signal line Wsu and the direction from the short-circuit signal line Wsd to the transmission driver 152A determined to be connected to the short-circuit signal line Wsd is electrically connected. As a result, the charge is supplied from the one end of the capacitive element Cext to the corresponding transmission driver 152A through the short-circuit signal line Wsu, and the charge is supplied from the other end of the capacitive element Cext to the corresponding transmission driver 152A through the short-circuit signal line Wsd. The potential of the output signal lines Wout, the potential of the short-circuit signal lines Wsu and Wsd, and the potential of both ends of the capacitive element Cext reach the intermediate potential.

Next, the control circuit 12 controls the short-circuit control elements SWUU and SWUD to the open state at the timing at which the potential of each output signal line Wout, the short-circuit signal lines Wsu and Wsd, and both ends of the capacitive element Cext reaches the intermediate potential. As a result, the corresponding transmission driver 152A shifts the potential of the output signal line Wout corresponding to each transmission driver 152A to the high level, and the transmission signals OUT0, OUT1, OUTn−1, and OUTn are transmitted through the linear electrodes 22.

Flow of Series of Operations Related to Output Circuit

Figure 13:
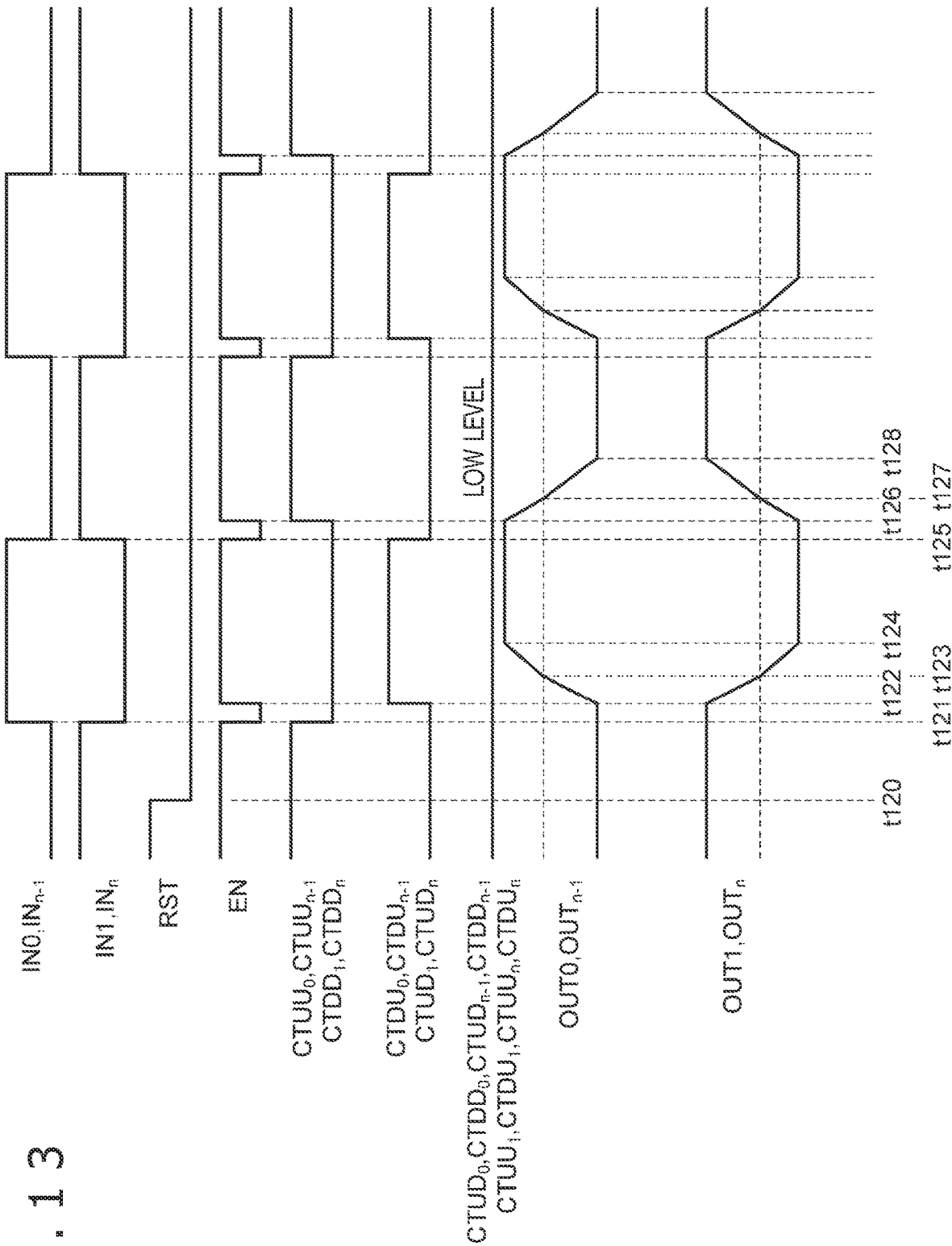
FIG. 13 is a timing chart illustrating an example of transition of potential of each signal in the output circuit according to the fourth embodiment of the present disclosure.

This completes the description of the configuration of the output circuit 15D. Next, the transition of the potential of each signal in the output circuit 15D will be described in detail. FIG. 13 is a timing chart illustrating the transition of the potential of each signal in the output circuit 15D according to the fourth embodiment. Note that, in FIG. 13, it is assumed that the control circuit 12 determines to connect the output signal lines Wout corresponding to the transmission signals OUT0 and OUTn−1 to the short-circuit signal line Wsu and connect the output signal lines Wout corresponding to the transmission signals OUT1 and OUTn to the short-circuit signal line Wsd.

At a time t120, the control circuit 12 switches the state of the reset signal RST to the low state to open both ends of the short-circuit control element SWr. As a result, both ends of the capacitive element Cext open.

At a time t121, the driver selection circuit 151 shifts the state of the input signals IN0 and INn−1 from the low state to the high state and shifts the state of the input signals IN1 and INn from the high state to the low state. The driver selection circuit 151 inputs the input signals IN0, IN1, INn−1, and INn to the corresponding transmission drivers 152A.

At the time t121, the control circuit 12 shifts the state of the control signals CTUU0, CTUUn−1, CTDD1, and CTDDn from the high state to the low state and outputs the control signals CTUU0, CTUUn−1, CTDD1, and CTDDn to the corresponding short-circuit control elements SWUU and SWDD to thereby open both ends of the short-circuit control elements SWUU and SWDD. In addition, at the time t121, the control circuit 12 switches the state of the transmission drivers 152A to the high impedance state.

At a time t122 after a predetermined time period from the time t121, the control circuit 12 shifts the state of the control signals CTDU0, CTDUn−1, CTUD1, and CTUDn from the low state to the high state and outputs the control signals CTDU0, CTDUn−1, CTUD1, and CTUDn to the corresponding short-circuit control elements SWDU and SWUD to thereby short-circuit both ends of the corresponding short-circuit control elements SWDU and SWUD. In addition, at the time t122, the control circuit 12 switches the state of the transmission drivers 152A to the output state.

As a result, at the time t122, the charge is supplied from the transmission drivers 152A corresponding to the transmission signals OUT1 and OUTn to the other end of the capacitive element Cext through the short-circuit signal line Wsu, and the charge is supplied from the one end of the capacitive element Cext to the transmission drivers 152A corresponding to the transmission signals OUT0 and OUTn−1 through the short-circuit signal line Wsd. As a result, the potential of the transmission signals OUT0, OUT1, OUTn−1, and OUTn starts to transition to the intermediate potential.

At a time t123, the potential of the transmission signals OUT0, OUT1, OUTn−1, and OUTn reaches the intermediate potential. As a result, the current control elements DU and DD are electrically disconnected at the time t123. In addition, at the time t123, the transmission drivers 152A corresponding to the transmission signals OUT0 and OUTn−1 supply the charge to the corresponding output signal lines Wout. As a result, the potential of the transmission signals OUT0 and OUTn−1 starts to transition from the intermediate potential to the high level at the time t123. In addition, at the time t123, the transmission drivers 152A corresponding to the transmission signals OUT1 and OUTn discharge the electricity from the corresponding output signal lines Wout. As a result, the potential of the transmission signals OUT1 and OUTn starts to transition from the intermediate potential to the low level at the time t123.

At a time t124, the charge is supplied from the corresponding transmission drivers 152A, so that the potential of the transmission signals OUT0 and OUTn−1 reaches the high level. In addition, at the time t124, the electricity is discharged from the corresponding transmission drivers 152A, so that the potential of the transmission signals OUT1 and OUTn reaches the low level.

At a time t125, the control circuit 12 shifts the state of the control signals CTDU0, CTDUn−1, CTUD1, and CTUDn from the high state to the low state and outputs the control signals CTDU0, CTDUn−1, CTUD1, and CTUDn to the corresponding short-circuit control elements SWDU and SWUD to thereby open both ends of the corresponding short-circuit control elements SWDU and SWUD. In addition, at the time t125, the control circuit 12 switches the state of the transmission drivers 152A to the high impedance state.

At a time t126 after a predetermined time period from the time t125, the control circuit 12 shifts the state of the control signals CTUU0, CTUUn−1, CTDD1, and CTDDn from the low state to the high state and outputs the control signals CTUU0, CTUUn−1, CTDD1, and CTDDn to the corresponding short-circuit control elements SWUU and SWDD to thereby short-circuit both ends of the corresponding short-circuit control elements SWUU and SWDD. In addition, at the time t126, the control circuit 12 switches the state of the transmission drivers 152A to the output state.

As a result, at the time t126, the charge is supplied from the transmission drivers 152A corresponding to the transmission signals OUT0 and OUTn−1 to the one end of the capacitive element Cext through the short-circuit signal line Wsu, and the charge is supplied from the other end of the capacitive element Cext to the transmission drivers 152A corresponding to the transmission signals OUT1 and OUTn through the short-circuit signal line Wsd. As a result, the potential of the transmission signals OUT0, OUT1, OUTn−1, and OUTn starts to transition to the intermediate potential.

At a time t127, the potential of the transmission signals OUT0, OUT1, OUTn−1, and OUTn reaches the intermediate potential. As a result, the current control elements DU and DD are electrically disconnected at the time t127. In addition, at the time t127, the transmission drivers 152A corresponding to the transmission signals OUT1 and OUTn supply the charge to the corresponding output signal lines Wout. As a result, the potential of the transmission signals OUT1 and OUTn starts to transition from the intermediate potential to the high level at the time t127. In addition, at the time t127, the transmission drivers 152A corresponding to the transmission signals OUT0 and OUTn−1 discharge the electricity from the corresponding output signal lines Wout. As a result, the potential of the transmission signals OUT0 and OUTn−1 starts to transition from the intermediate potential to the low level at the time t127.

At a time t128, the charge is supplied from the corresponding transmission drivers 152A, so that the potential of the transmission signals OUT1 and OUTn reaches the high level. In addition, at the time t128, the electricity is discharged from the corresponding transmission drivers 152A, so that the potential of the transmission signals OUT0 and OUTn−1 reaches the low level.

This completes the description of the transition of the potential of each signal in the output circuit 15D. Note that the flow of the series of processes in the output circuit 15D is similar to that of the third embodiment, and the description will not be repeated.

Effects

As described above, the sensor controller 10 is connected to the touch sensor 20 having the plurality of linear electrodes 21 and 22 arranged in a plane shape in the present embodiment. The sensor controller 10 includes the plurality of transmission drivers 152A each having the positive power supply terminal and the negative power supply terminal, the plurality of transmission drivers 152A being configured to generate the signal waveform transitioning between the first potential (low level) supplied to the negative power supply terminal and the second potential (high level), which is potential higher than the first potential (low level), supplied to the positive power supply terminal and output the signal waveform as a transmission signal to the corresponding linear electrodes 22, and the intermediate potential supply unit 153D that generates the intermediate potential between the first potential (low level) and the second potential (high level), supplies the intermediate potential to at least one of the positive power supply terminal and the negative power supply terminal of at least one transmission driver 152A in the period from the time point that the potential of the signal waveform starts to transition from the first potential (low level) to the second potential (high level) or from the second potential (high level) to the first potential (low level) to the time point that the potential of the positive power supply terminal and the negative power supply terminal of the transmission driver 152A reaches the intermediate potential, and stops the supply of the intermediate potential at the timing at which the potential of at least one of the positive power supply terminal and the negative power supply terminal reaches the intermediate potential.

According to the configuration, the sensor controller 10 supplies the intermediate potential from the intermediate potential supply unit 153D to the transmission driver 152A only in the necessary period. Therefore, the sensor controller 10 can suppress the through current and reduce the power consumption more than in the conventional configuration.

Further, the intermediate potential supply unit 153D in the present embodiment includes the plurality of first output control circuits 155B that discharge the electricity from the corresponding transmission drivers 152A at the timing at which the potential of the signal waveforms of the corresponding transmission drivers 152A falls, and the plurality of second output control circuits 156B that supply the intermediate potential to the corresponding transmission drivers 152A at the timing at which the potential of the signal waveforms of the corresponding transmission drivers 152A rises.

According to the configuration, the sensor controller 10 supplies the intermediate potential from the intermediate potential supply unit 153D to the transmission drivers 152A only in the necessary period. Therefore, the sensor controller 10 can suppress the through current and reduce the power consumption more than in the conventional configuration.

Furthermore, the sensor controller 10 in the present embodiment includes the control circuit 12 that transmits the control signals CTUU, CTUD, CTDU, and CTDD, and the intermediate potential supply unit 153D includes the first short-circuit signal line Wsu and the second short-circuit signal line Wsd. One end of the first output control circuit 155B is connected to the negative power supply terminal of the corresponding transmission driver 152A, the other end of the first output control circuit 155B is connected to the first short-circuit signal line Wsu and the second short-circuit signal line Wsd, and the first output control circuit 155B is electrically connected or electrically disconnected in the direction from the corresponding negative power supply terminal to the first short-circuit signal line Wsu or the second short-circuit signal line Wsd according to the control signals CTDU and CTDD. One end of the second output control circuit 156B is connected to the positive power supply terminal of the corresponding transmission driver 152A, the other end of the second output control circuit 156B is connected to the first short-circuit signal line Wsu and the second short-circuit signal line Wsd, and the second output control circuit 156B is electrically connected or electrically disconnected in the direction from the first short-circuit signal line Wsu and the second short-circuit signal line Wsd to the positive power supply terminal of the corresponding transmission driver 152A according to the control signals CTUU and CTUD.

According to the configuration, the sensor controller 10 electrically disconnects the current path in the direction from the negative power supply terminal of the corresponding transmission driver 152A to the short-circuit signal lines Wsu and Wsd at the timing at which the potential of the short-circuit signal lines Wsu and Wsd exceeds the potential of the negative power supply terminal of the corresponding transmission driver 152A. In addition, the sensor controller 10 electrically disconnects the current path in the direction from the short-circuit signal lines Wsu and Wsd to the positive power supply terminal of the corresponding transmission driver 152A at the timing at which the potential of the positive power supply terminal of the corresponding transmission driver 152A exceeds the potential of the short-circuit signal lines Wsu and Wsd. Therefore, according to the present disclosure, the sensor controller 10 supplies the intermediate potential from the intermediate potential supply unit 153D to the transmission drivers 152A only in the necessary period. Therefore, the sensor controller 10 can suppress the through current and reduce the power consumption more than in the conventional configuration.

Modifications

Note that the present disclosure is not limited to the embodiments described above. That is, those skilled in the art can appropriately change the design of the embodiments, and the changed embodiments are also included in the scope of the present disclosure as long as the changed embodiments have the features of the present disclosure. In addition, the elements included in the embodiments and modifications described later can be combined if technically possible, and the combinations are also included in the scope of the present disclosure as long as the combinations have the features of the present disclosure.

For example, although it is desirable in the embodiments described above that the number of values "0" and the number of values "1" included in the codes for determining the values allocated to the transmission drivers 152A be approximately the same, the ratio of the values "0" to the values "1" included in the codes may be approximately 45:55 or 55:45.

In addition, although one transmission driver 152 is provided for one linear electrode 22 in the embodiments, one transmission driver 152 may be provided for one linear electrode 21. That is, the transmission driver 152 may amplify the input signal IN input from the driver selection circuit 151 to a signal with a potential difference that allows transmission of the signal from the linear electrode 21. The transmission driver 152 may then set the amplified signal as the transmission signal OUT and transmit the transmission signal OUT to the corresponding linear electrode 21 through the output signal line Wout.

In addition, the touch sensor 20 may include a switch element. Further, at least one of the plurality of linear electrodes 22 may detect a press of the switch element.

According to the configuration, the through current can also be suppressed and the power consumption can also be reduced when at least one of the linear electrodes 22 detects a press of the switch of the touch sensor 20.

In addition, although the transmission driver 152 has the function for switching the state of output to the output state and the high impedance state in the embodiments, the transmission driver 152 may not have the function for switching the state of output to the output state and the high impedance state in the third and fourth embodiments.

According to the configuration, the transmission driver 152 can reduce the power consumption even when the transmission driver 152 does not have the function for switching the state of output to the output state and the high impedance state.

DESCRIPTION OF REFERENCE SYMBOLS

10: Sensor controller
20: Touch sensor
152: Transmission driver
153: Intermediate potential supply unit The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A sensor controller connected to a touch sensor having a plurality of detection electrodes, the sensor controller comprising:
a plurality of transmission drivers each having a negative power supply terminal supplied with a first potential and a positive power supply terminal supplied with a second potential higher than the first potential, wherein each of the plurality of transmission drivers, in operation, generates a signal waveform that transitions between the first potential and the second potential and outputs the signal waveform as a transmission signal to a corresponding one of the detection electrodes;
an intermediate potential supply unit having a potential generation circuit that includes a voltage source or a capacitive element separate from the transmission drivers, wherein the intermediate potential supply unit, in operation, outputs a voltage from the potential generation circuit at first timings at which a potential of the signal waveform generated by at least one of the transmission drivers starts to transition from the first potential to the second potential or from the second potential to the first potential, and supplies an intermediate potential between the first potential and the second potential to at least one of the positive power supply terminal or the negative power supply terminal of the at least one of the transmission drivers,
wherein an output side of the potential generation circuit is connected to two or more of the plurality of transmission drivers; and
a control circuit that, in operation, transmits a control signal,
wherein each of the transmission drivers has an output mode for outputting the transmission signal and a stop mode for stopping supply of the second potential from a power supply line to the positive power supply terminal and supply of the first potential from a reference line to the negative power supply terminal to shift a state of output to a high impedance state,
wherein the control circuit, in operation, controls the transmission drivers to enter the stop mode at the first timings and controls the transmission drivers to enter the output mode at second timings after a predetermined time period from the first timings, and
wherein the intermediate potential supply unit includes:
a plurality of first short-circuit control elements, wherein each of the first short-circuit control elements has two ends short-circuited or opened according to the control signal, a first one of the two ends being connected to a corresponding positive power supply terminal, and a second one end of the two ends being connected to the output side of the potential generation circuit, and
a plurality of second short-circuit control elements, wherein each of the second short-circuit control elements has two ends short-circuited or opened according to the control signal, a first one of the two ends being connected to a corresponding negative power supply terminal, and a second one end of the two ends being connected to the output side of the potential generation circuit, and
wherein the control circuit, in operation, controls at least one of the first short-circuit control elements or the second short-circuit control elements to short-circuit at the first timings and controls the at least one of the first short-circuit control elements or the second short-circuit control elements short-circuited at the first timings to open at the second timings.

2. The sensor controller according to claim 1, wherein the control circuit, in operation, controls the first short-circuit control elements to short-circuit at a timing at which the potential of the signal waveform generated by at least one of the transmission drivers starts to transition from the first potential to the second potential in the first timings, and controls the second short-circuit control elements to short-circuit at a timing at which the potential of the signal waveform generated by the at least one of the transmission drivers starts to transition from the second potential to the first potential in the first timings.

3. The sensor controller according to claim 1, wherein the potential generation circuit includes the capacitive element, and the intermediate potential supply unit includes:
- a first short-circuit signal line connected to a first end of the capacitive element,
- a second short-circuit signal line connected to a second end of the capacitive element,
- a plurality of first short-circuit control elements, wherein each of the first short-circuit control elements has two ends short-circuited or opened according to the control signal, a first one of the two ends being connected to the positive power supply terminal of a corresponding transmission driver, and a second one of the two ends being connected to the first short-circuit signal line,
- a plurality of second short-circuit control elements, wherein each of the second short-circuit control elements has two ends short-circuited or opened according to the control signal, a first one of the two ends being connected to the positive power supply terminal of the corresponding transmission driver, and a second one of the two ends being connected to the second short-circuit signal line,
- a plurality of third short-circuit control elements, wherein each of the third short-circuit control elements has two ends short-circuited or opened according to the control signal, a first one of the two ends being connected to the negative power supply terminal of a corresponding transmission driver, and a second one of the two ends being connected to the first short-circuit signal line, and
- a plurality of fourth short-circuit control elements, wherein each of the fourth short-circuit control elements has two ends short-circuited or opened according to the control signal, a first one of the two ends being connected to the negative power supply terminal of the corresponding transmission driver, and a second one of the two ends being connected to the second short-circuit signal line.

4. The sensor controller according to claim 3, wherein the control circuit, in operation, determines, for each transmission driver of the transmission drivers, to which one of the first short-circuit signal line and the second short-circuit signal line the transmission driver is to be connected, controls at least one of a corresponding first short-circuit control element and third short-circuit control element to short-circuit at the first timings and open at the second timings when the control circuit determines to connect the transmission driver to the first short-circuit signal line, and controls at least one of a corresponding one of the second short-circuit control elements or a corresponding one of the fourth short-circuit control elements to short-circuit at the first timings and open at the second timings when the control circuit determines to connect the transmission driver to the second short-circuit signal line.

5. The sensor controller according to claim 1, further comprising:
wherein the intermediate potential supply unit includes:
- a short-circuit signal line,
- a plurality of first output control circuits each having a first end connected to the negative power supply terminal of a corresponding transmission driver and a second end connected to the short-circuit signal line, and each of the plurality of first output control circuits being electrically connected only in a first direction from the negative power supply terminal of the corresponding transmission driver to the short-circuit signal line according to the control signal, and
- a plurality of second output control circuits each having a first end connected to the positive power supply terminal of the corresponding transmission driver and a second end connected to the short-circuit signal line, and each of the plurality of second output control circuits being electrically connected only in a second direction from a corresponding short-circuit signal line to the positive power supply terminal of the corresponding transmission driver according to the control signal.

6. The sensor controller according to claim 5, wherein each of the first output control circuits includes an n-type transistor in which a source terminal is connected to the negative power supply terminal of the corresponding transmission driver, a drain terminal is connected to the short-circuit signal line, and the first potential is supplied to a gate terminal or the intermediate potential is supplied to the gate terminal from a voltage source that is different from the corresponding transmission driver and the intermediate potential supply unit, and each of the second output control circuits includes a p-type transistor in which a source terminal is connected to the positive power supply terminal of the corresponding transmission driver, a drain terminal is connected to the short-circuit signal line, and the second potential is supplied to a gate terminal or the intermediate potential is supplied to the gate terminal from the voltage source that is different from the corresponding transmission driver and the intermediate potential supply unit.

7. The sensor controller according to claim 5, wherein the control circuit, in operation, controls each of the first output control circuits to be electrically connected only in the first direction at a timing at which the potential of the signal waveform of the corresponding transmission driver falls, and to be electrically disconnected at a timing at which the potential of the signal waveform of the corresponding transmission driver rises, and the control circuit, in operation, controls each of the second output control circuits to be electrically connected only in the second direction at a timing at which the potential of the signal waveform of the corresponding transmission driver rises, and to be electrically disconnected at a timing at which the potential of the signal waveform of the corresponding transmission driver falls.

8. The sensor controller according to claim 1, wherein a potential difference between the first potential and the second potential is equal to or greater than 5 V.

9. The sensor controller according to claim 1, wherein the touch sensor includes a switch, and
at least one of the detection electrodes, in operation, detects depression of the switch.

10. A sensor controller connected to a touch sensor having a plurality of detection electrodes, the sensor controller comprising:
- a plurality of transmission drivers each having a negative power supply terminal supplied with a first potential and a positive power supply terminal supplied with a second potential higher than the first potential, wherein each of the plurality of transmission drivers, in operation, generates a signal waveform that transitions between the first potential and the second potential and outputs the signal waveform as a transmission signal to a corresponding one of the detection electrodes; and an intermediate potential supply unit that, in operation, generates an intermediate potential between the first potential and the second potential, supplies the intermediate potential to at least one of the positive power supply terminal and the negative power supply terminal of at least one of the transmission drivers in a period from a time point that a potential of the signal waveform generated by the at least one of the transmission drivers starts to transition from the first potential to the second potential or from the second potential to the first potential to a time point that a potential of the positive power supply terminal and a potential of the negative power supply terminal of the at least one of the transmission drivers reaches the intermediate potential, and stops supplying the intermediate potential at a timing at which the potential of at least one of the positive power supply terminal and the negative power supply terminal of the at least one of the transmission drivers reaches the intermediate potential, wherein the intermediate potential supply unit includes:
a plurality of first output control circuits, wherein each of the first output control circuits, in operation, discharges electricity from a corresponding transmission driver at a timing at which the potential of the signal waveform of a corresponding transmission driver falls, and a plurality of second output control circuits, wherein each of the first output control circuits, in operation, supplies the intermediate potential to the corresponding transmission driver at a timing at which the potential of the signal waveform of the corresponding transmission driver rises.

11. The sensor controller according to claim 10, wherein the intermediate potential supply unit includes a potential generation circuit that has a voltage source or a capacitive element separate from the transmission drivers, and the intermediate potential supply unit, in operation, outputs a voltage from the potential generation circuit in a period from a timing of a start of a transition from the first potential to the second potential or a transition from the second potential to the first potential to a timing at which the potential of the positive power supply terminal or the negative power supply terminal of the transmission drivers reaches the intermediate potential, and supplies the intermediate potential to the transmission drivers.

12. The sensor controller according to claim 10, further comprising:
a control circuit that, in operation, transmits a control signal, wherein the intermediate potential supply unit includes a first short-circuit signal line and a second short-circuit signal line, wherein a first end of each of the first output control circuits is connected to the negative power supply terminal of the corresponding transmission driver, a second end of each of the first output control circuits is connected to the first short-circuit signal line and the second short-circuit signal line, and each of the first output control circuits, in operation, is electrically connected or electrically disconnected in a direction from a corresponding negative power supply terminal to the first short-circuit signal line or the second short-circuit signal line according to the control signal, and wherein a first end of each of the second output control circuits is connected to the positive power supply terminal of the corresponding transmission driver, a second end of each of the second output control circuits is connected to the first short-circuit signal line and the second short-circuit signal line, and each of the second output control circuits, in operation, is electrically connected or electrically disconnected in a direction from the first short-circuit signal line and the second short-circuit signal line to the positive power supply terminal of the corresponding transmission driver according to the control signal.

13. An electronic device comprising:
a touch sensor having a plurality of detection electrodes; and a sensor controller connected to the touch sensor, the sensor controller including:
a plurality of transmission drivers each having a negative power supply terminal supplied with a first potential and a positive power supply terminal supplied with a second potential higher than the first potential, wherein each of the plurality of transmission drivers, in operation, generates a signal waveform that transitions between the first potential and the second potential and outputs the signal waveform as a transmission signal to a corresponding one of the detection electrodes, and an intermediate potential supply unit having a potential generation circuit that includes a voltage source or a capacitive element separate from the transmission drivers, wherein the intermediate potential supply unit, in operation, outputs a voltage from the potential generation circuit at first timings at which a potential of the signal waveform generated by at least one of the transmission drivers starts to transition from the first potential to the second potential or from the second potential to the first potential, and supplies an intermediate potential between the first potential and the second potential to at least one of the positive power supply terminal or the negative power supply terminal of the at least one of the transmission driver, wherein an output side of the potential generation circuit is connected to two or more of the plurality of transmission drivers; and a control circuit that, in operation, transmits a control signal, wherein each of the transmission drivers has an output mode for outputting the transmission signal and a stop mode for stopping supply of the second potential from a power supply line to the positive power supply terminal and supply of the first potential from a reference line to the negative power supply terminal to shift a state of output to a high impedance state, wherein the control circuit, in operation, controls the transmission drivers to enter the stop mode at the first timings and controls the transmission drivers to enter the output mode at second timings after a predetermined time period from the first timings, and wherein the intermediate potential supply unit includes:
a plurality of first short-circuit control elements, wherein each of the first short-circuit control elements has two ends short-circuited or opened according to the control signal, a first one of the two ends being connected to a corresponding positive power supply terminal, and a second one end of the two ends being connected to the output side of the potential generation circuit, and
a plurality of second short-circuit control elements, wherein each of the second short-circuit control elements has two ends short-circuited or opened according to the control signal, a first one of the two ends being connected to a corresponding negative power supply terminal, and a second one end of the two ends being connected to the output side of the potential generation circuit, and
wherein the control circuit, in operation, controls at least one of the first short-circuit control elements or the second short-circuit control elements to short-circuit at the first timings and controls the at least one of the first short-circuit control elements or the second short-circuit control elements short-circuited at the first timings to open at the second timings.

* * * * *